United States Patent
Solomon et al.

(10) Patent No.: US 7,497,945 B2
(45) Date of Patent: Mar. 3, 2009

(54) PRE-CAST DRIVE DOWN WATER SEPARATION PIT SYSTEM

(76) Inventors: Michael A. Solomon, 8507-J Falls Run Rd., Elicott City, MD (US) 21043; Geoffrey L. Fisher, 3700 S. 9th St., Arlington, VA (US) 22204

(*) Notice: Subject to any disclaimer, the term of this patent is extended or adjusted under 35 U.S.C. 154(b) by 0 days.

(21) Appl. No.: 11/806,683

(22) Filed: Jun. 1, 2007

(65) Prior Publication Data
US 2007/0235393 A1 Oct. 11, 2007

Related U.S. Application Data

(63) Continuation-in-part of application No. PCT/US2005/000475, filed on Jan. 10, 2005.

(51) Int. Cl.
*B01D 21/02* (2006.01)

(52) U.S. Cl. .......... 210/154; 210/170.01; 210/237; 210/299; 210/521; 210/532.1; 210/538; 52/124.2; 52/125.4; 52/125.6; 52/169.7; 134/104.2; 134/109

(58) Field of Classification Search .......... 210/154, 210/170.01, 170.08, 237, 299, 521, 532.1, 210/538, 540; 52/124.1, 124.2, 125.4, 125.6, 52/169.7, 741.12; 134/104.2, 104.4, 109
See application file for complete search history.

(56) References Cited

U.S. PATENT DOCUMENTS

| | | | |
|---|---|---|---|
| 357,349 A * | 2/1887 | Waring | 210/532.1 |
| 745,870 A * | 12/1903 | Lowe | 210/532.1 |
| 1,654,073 A * | 12/1927 | Fagan | 52/169.7 |
| 3,438,157 A * | 4/1969 | La Monica | 52/124.2 |
| 3,596,417 A * | 8/1971 | Zachry | 52/125.4 |
| 3,727,707 A | 4/1973 | Machala | |
| 3,764,011 A * | 10/1973 | Owens | 210/237 |
| 4,807,407 A * | 2/1989 | Horn | 52/125.6 |
| 5,011,609 A | 4/1991 | Fink | |
| 5,108,609 A * | 4/1992 | Burt | 210/532.1 |
| 5,228,983 A * | 7/1993 | Nims | 210/521 |
| 5,587,065 A | 12/1996 | Burns | |
| 5,597,001 A * | 1/1997 | Rasmussen et al. | 134/104.2 |
| 5,746,912 A * | 5/1998 | Monteith | 210/170.08 |
| 5,779,888 A * | 7/1998 | Bennett | 210/162 |
| 6,077,448 A * | 6/2000 | Tran-Quoc-Nam et al. | 210/532.1 |
| 6,247,480 B1 * | 6/2001 | Wegner | 210/538 |
| 6,434,900 B1 * | 8/2002 | Masters | 52/125.4 |
| 6,655,396 B2 * | 12/2003 | Krenzel | 134/104.4 |
| 6,966,984 B1 * | 11/2005 | Solomon | 210/170.08 |
| 2002/0121293 A1 * | 9/2002 | McCormick et al. | 134/109 |
| 2004/0098931 A1 | 5/2004 | Sanders | |

* cited by examiner

*Primary Examiner*—Christopher Upton
(74) *Attorney, Agent, or Firm*—Richard C. Litman

(57) ABSTRACT

A unitary or modular, pre-cast, drive-down pit system suitable for use in a heavy equipment wash installation. The completed pit collects runoff generated by the washing of heavy equipment such as construction, industrial, farming, or road-building equipment. The pre-cast concrete separation unit and separate wall sections have tongue and groove mating ends that facilitate assembling the pit and provide for sealing against leakage of water. The separation unit has up to four chambers: a primary solids collection section; a secondary solids settling chamber; a free oil separating section; and a pump water holding section.

15 Claims, 22 Drawing Sheets

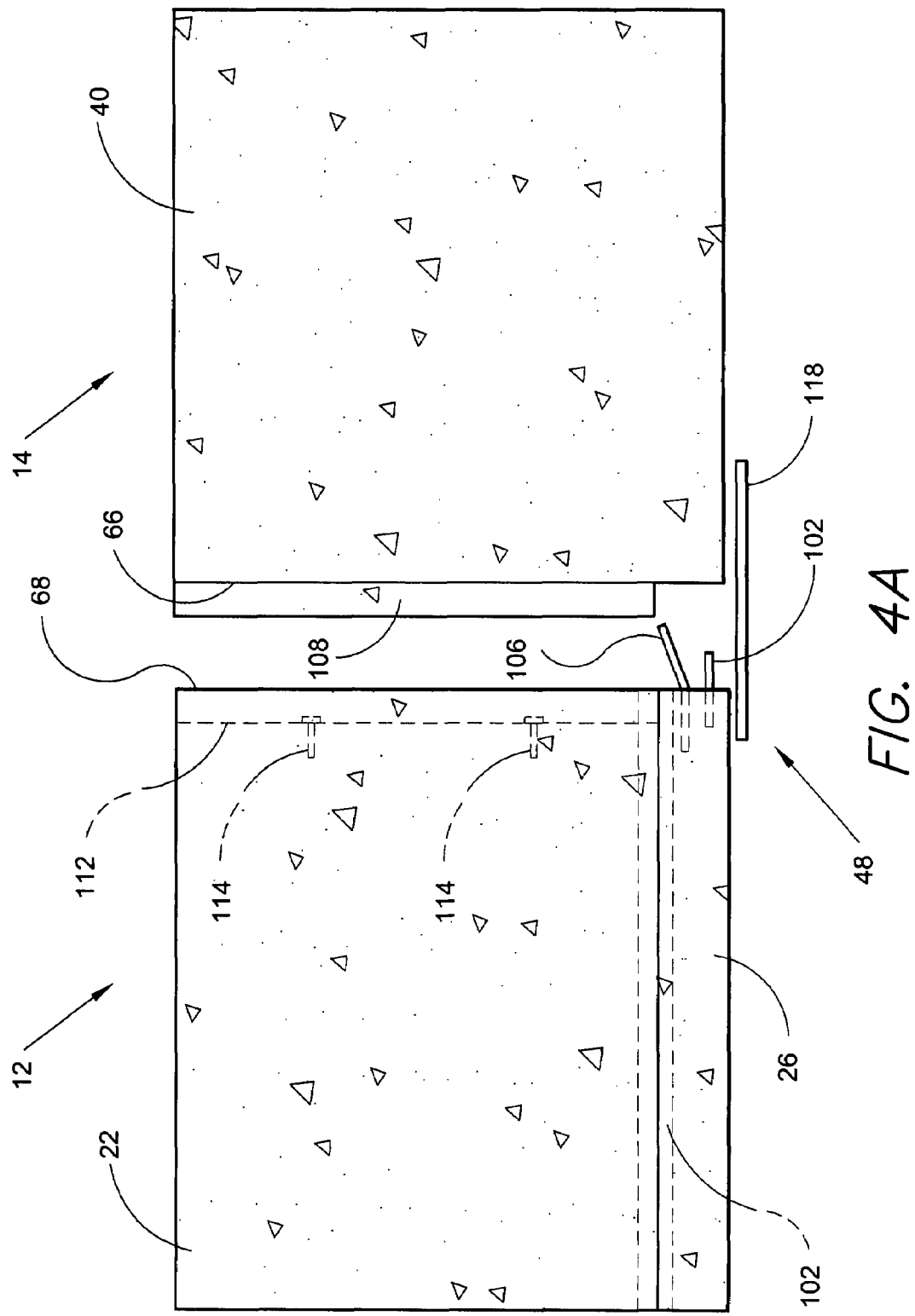

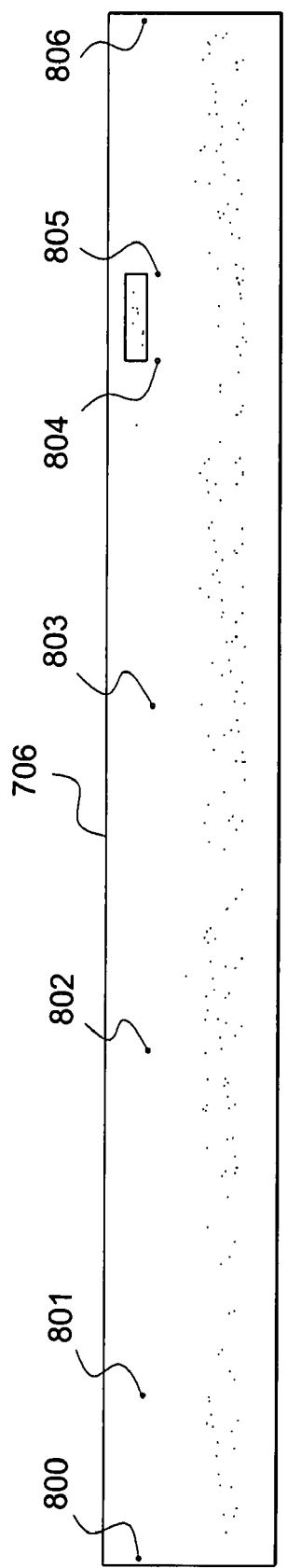
FIG. 21
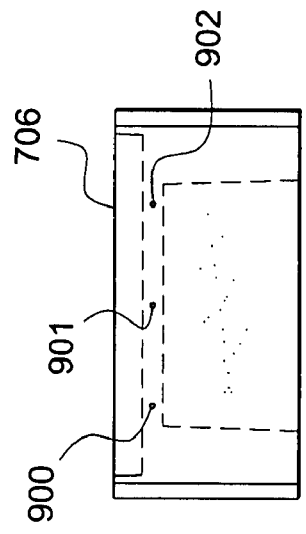
FIG. 23
FIG. 22

PRE-CAST DRIVE DOWN WATER SEPARATION PIT SYSTEM

CROSS-REFERENCE TO RELATED APPLICATION

This application is a continuation-in-part of application PCT/US 2005/000475 filed Jan. 10, 2005 and claims the benefit of U.S. application Ser. No. 11/002,675, filed Dec. 3, 2004, now U.S. Pat. No. 6,966,984.

BACKGROUND OF THE INVENTION

1. Field of the Invention

The present invention relates to solids and free oil/water separation devices. More particularly, the present invention relates to a pre-cast unitary or modular assembly forming a pit for the pretreatment of water in a washpad installation for construction equipment and the like.

2. Description of the Related Art

Recent legislation has imposed strict limitations on the release of pollutants. This is particularly true in sensitive watershed areas such as that for the Chesapeake Bay watershed area. Construction equipment, road building equipment, farm equipment, and the like tend to collect oil and grease on their surfaces, along with dust and dirt, some of which clings to the oil-covered surfaces. It is necessary to periodically wash this equipment with pressure washers, resulting in wash water polluted with dirt, gravel, stones oil, and greases. It is also desirable to recycle the wash water for use in the pressure washers.

In response to the environmental requirements, it has become common practice to provide a drive-down pit for separating the wash water from dirt, stones, and gravel by settling, and oil and grease by consumption with enzymes or use of skimmers. This pretreatment of the wash water is necessary, regardless of the type of equipment being used for the recycling and/or discharge of the wash water. Such pits have a primary separation section where stones, gravel, and clumps of dirt are allowed to sink to the bottom. It is necessary to periodically remove such coarse material by providing a ramp for driving down a front-loading tractor into the water-containing pit and removing this material by manipulating the bucket of the tractor and backing out of the pit up the ramp.

The free oil and grease float to the water surface and is captured and then consumed by enzymes placed in tablet form in the pit or skimmed from the pit and removed for proper disposal. The enzymes are effective during summer months, while skimming is used in colder weather. Pretreated water is pumped from the pit as dirty water drains into the pit from the wash pad. The pretreated water is further cleaned by various types of separation equipment to be recycled to the pressure washers or discharged.

It typically takes two to three weeks to build forms and pour the concrete to complete the construction of the floor, walls, and ramp of such a pit, costing valuable labor time and delaying the use of a wash installation. Water leakage is a problem due to the multiple pours required, which may undermine the pit. It would be desirable to provide a unitary or modular pit system which can be customized for any pretreatment requirements and which can be quickly installed with the elimination or minimization of concrete pouring. Such a system would eliminate the need for building concrete casting forms and eliminate water leakage.

Thus a pre-cast drive-down pit system solving the aforementioned problems is desired.

SUMMARY OF THE INVENTION

The present invention is a unitary or modular, pre-cast, drive-down pit system suitable for use in a heavy equipment wash installation. The installed pit collects runoff generated by the washing of heavy equipment such as construction, industrial, farming, or road-building equipment. The modular system has a pre-cast concrete separation unit and a drive-down section. The drive-down section has separate modular walls having tongue and groove mating ends for mating with the separation unit. The tongue and groove mating ends facilitate assembly of the pit and provide for positive sealing against leakage of water. The walls have built-in rebar attachment and water block elements at a predetermined angle so as to provide for a strong and waterproof bond with the ramp floor. The ramp floor is concrete, poured after installation of the separation unit and the wall sections to complete the finished drive-down pit. The separation unit has up to four chambers: a primary solids collection chamber; a secondary solids settling chamber; a free oil separating chamber; and a sump pump chamber. The unitary system includes the separation unit and the drive-down section cast of concrete as a single unit.

The separation unit design provides for a hydraulic line depth to accommodate the apparatus to remove heavy solids. This depth is determined by overflow dams for flow of water successively traveling between the separation chambers, the free oil separating chamber having a standpipe and conduit for feeding the sump pump chamber of the separation unit. The separate wall sections feature an inner surface with a vertical face and an outer surface having an outward protruding footing or base. The modular nature of the pre-cast collection and separation pit of the present invention allows a quick leak-proof installation for the collection and pretreatment of water from a washing pad.

It is an aspect of the invention to provide improved elements and arrangements thereof for the purposes described which is cost effective, dependable and fully effective in accomplishing its intended purposes.

These and other aspects of the present invention will become readily apparent upon further review of the following specification and drawings.

BRIEF DESCRIPTION OF THE DRAWINGS

FIG. 4A is a detail view of the water separation unit connection with a drive-down wall unit of FIG. 1 prior to assembly.

FIG. 21 is a sectional side view showing the re-bar insert locations of a pre-cast drive down unit according to the present invention.

FIG. 22 is a sectional end view showing the re-bar insert locations of a pre-cast drive down unit according to the present invention.

FIG. 23 is a sectional end view showing the re-bar insert locations of a pre-cast drive down unit according to the present invention.

Similar reference characters denote corresponding features consistently throughout the attached drawings.

DETAILED DESCRIPTION OF THE PREFERRED EMBODIMENTS

The present invention is unitary or a modular, pre-cast, drive-down pit system suitable for use in a heavy equipment wash installation.

Figure 1:
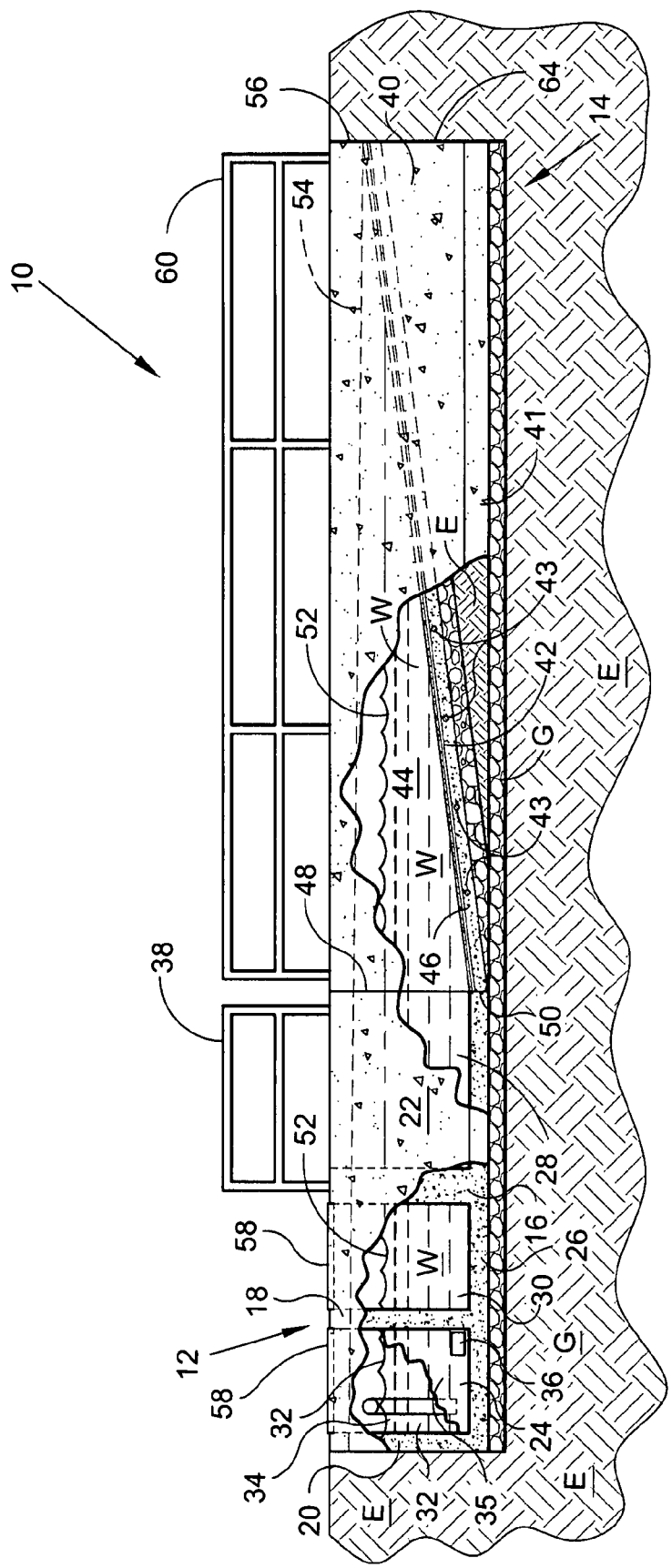
FIG. 1 is an environmental side elevation view partially broken away, of the modular drive-down water separation and purification pit of the present invention.

Referring to FIG. 1, there is shown a side elevation, view, partially broken away, of the modular drive-down pit system of the present invention as installed, generally referred to by the reference No. 10. Modular drive-down pit system 10 includes a generally rectangular separation unit 12 and pit wall units 14. Water separation unit 12 has a front wall 16, an intermediate wall 18 and a rear wall 20, all between sidewalls 22. Sidewalls 22 extend equally and substantially forward of separation unit front wall 16. A rear longitudinal wall 24 is parallel to and spaced from sidewalls 22, extending between intermediate wall 18 and rear wall 20. Separation unit 12 has a horizontally disposed floor 26 extending from the front ends of sidewalls 22 to the rear wall 20 to form an integral unit.

The forward portions of sidewalls 22 and floor 26 define a primary solids separation section 28 for separating heavy components from the wash runoff water entering pit 10 through settling. The front wall 16, intermediate wall 18, sidewalls 22, and floor 26 define secondary solids separation section 30 for separating finer dispersed solids from the water through settling. Rear longitudinal wall 24 separates the section formed defined by intermediate wall 18, rear wall 20, sidewalls 22 and floor 26 into an oil separation section 32 and a sump pump section 35.

An oil separation standpipe and exit conduit 34 extends from a point proximate the floor of oil separation section 32 and connects oil separation section 32 with sump pump section 35 at hydraulic level 52. A submersible pump 36 is located in sump pump section 35 for removal of the pretreated water from the pit system 10. Water separation unit 12 has a handrail 38 extending along the upper surface of sidewalls 22 and front wall 16 to surround primary solids separation section 28.

The sidewalls of pit wall units 14 each have an outward-extending footer 41 along the lower portions of respective pit wall units 14. Each sidewall 40 has an imbedded ramp water-block element 42 extending inward along a sloping angle from the forward end 64 to the connection joint 48 connecting water separation unit 48 and pit wall units 14. A series of rebar connectors 43 are embedded in each sidewall below water-block element 42 and spaced therealong. A concrete ramp 46 is poured over a gravel bed G and backfill earth E to form a ramp section 44 and complete the installation of the modular drive-down water pretreatment pit 10.

As shown, the ramp 46, as poured, seals over waterblock 42 making a watertight joint. Rebar (not shown) is attached between the rebar connectors 43 extending from opposite sidewalls 40 of pit wall units 14 before pouring the concrete of ramp 46 for reinforcement of the ramp. A connection 50 is made between separation unit floor 40 and ramp 46 upon pouring the ramp 46. The gradation of the wash pad is shown in hidden line 54 along the upper portion of drive-down pit 10. Each pit wall unit 14 has a handrail 60 extending along its respective upper edge. Water runoff from the wash pad enters the pit 10 at runoff water entry 56. Separation unit cover grates 58 cover the secondary solids separation section 30, the oil separation section 32, and the sump pump section 35.

Figure 2A:
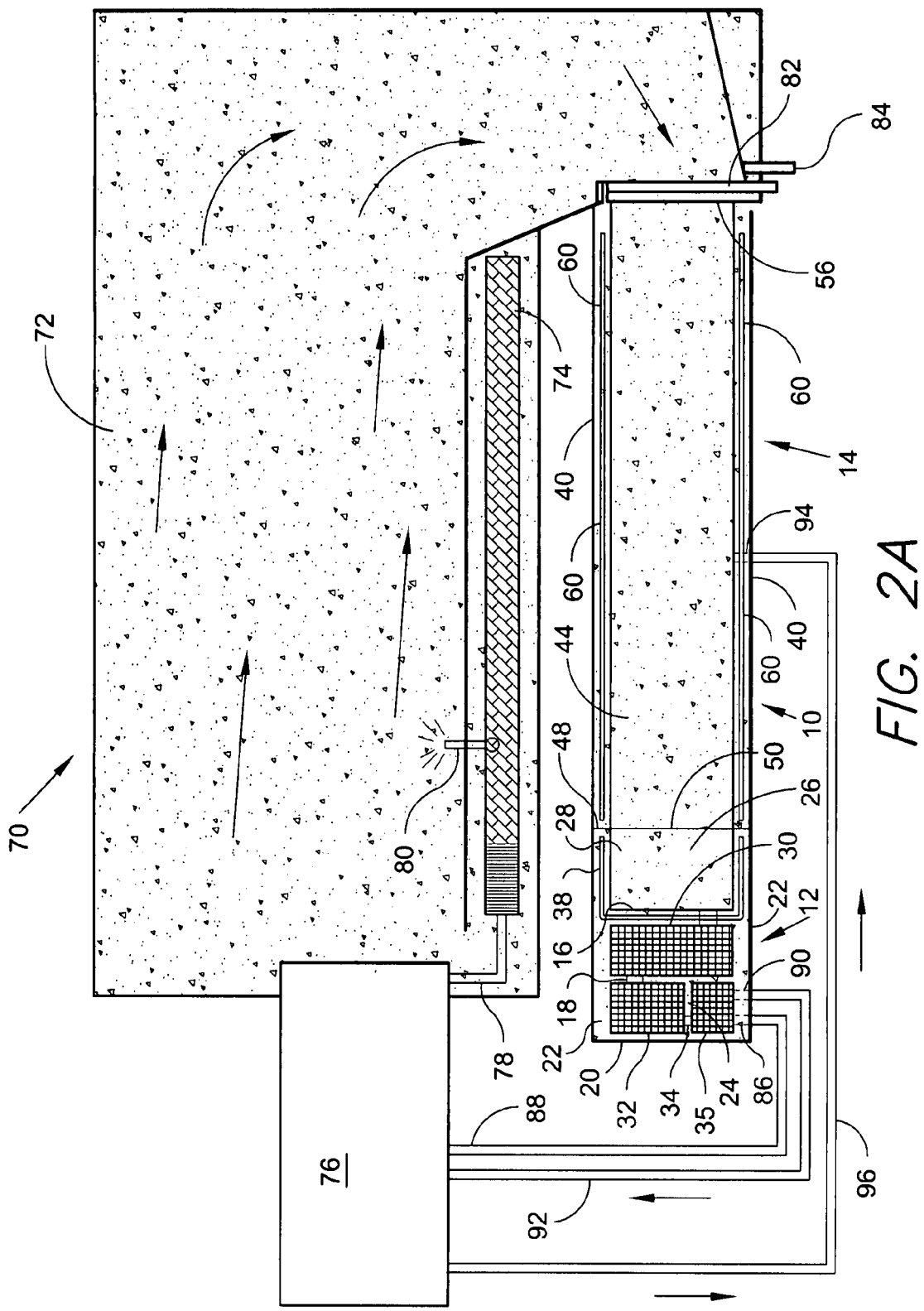
FIG. 2A is a plan view of the pit installation of FIG. 1, with an equipment room such as a pump and filter facility and wash pad.

Referring to FIG. 2A there is shown a plan view of a construction equipment wash installation having a wash pad and circulation system 70 shown in connection with the inventive modular drive-down water pretreatment pit 10. Wash pad and circulation system 70 has a sloping wash pad 72, preferably of concrete. A catwalk 74 divides the wash pad 72 and the pit 10 for ease in pressure washing of equipment by a workman. An equipment room 76 contains pumps, filters, and conduits of conventional configuration for final filtering of recycle water from pit 10, supplying wash nozzle supply line 78 and wash nozzle 80 with filtered water for washing equipment parked on wash pad 72. A rainwater diverter 82 is put in place when the pit and circulating system are not in use to divert rainwater draining from pad 72 to pit 10. A closure 84 is placed so as to complete the channel between the pad 72 and pit 10 at runoff water entry 56 when the rainwater diverter 82 is removed for washing operations.

An electrical pump service conduit 88 is connected with pump 36 through pump electrical service aperture 86 in the sidewall 22 of pump water collection section 35 for electrical service supplied from pump and filter facility 76. A pump water conduit 92 conducts water from sump pump 36 through pump water conduit aperture 90 in sidewall 22 and into equipment room 76. A filter flush return conduit 96 extends from pump and filter facility 76 and through filter flush return line aperture 94 in sidewall 40 so as to return water used in periodic flushing of filters to ramp section 44 for separation of solids from the flush water. Apertures 86 and 90 may be located in rear wall 20 as desired and the unit 12 may be supplied with both pairs of apertures, each filled with knockout plugs for fitting different size conduits.

Figure 2B:
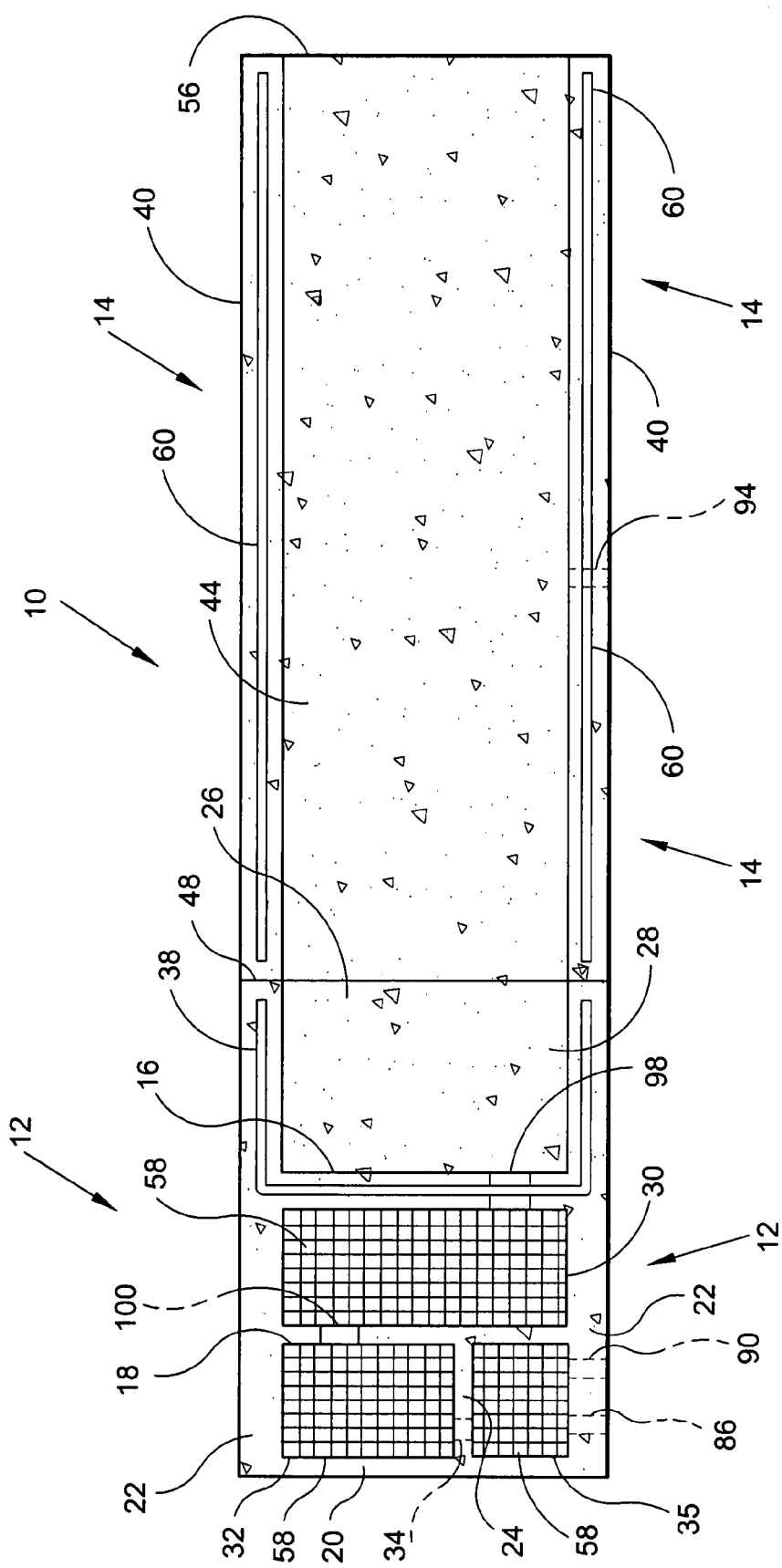
FIG. 2B is a plan view of the drive-down water separation pit of FIG. 1 with grates and railing in place.

Referring to FIG. 2B there is shown a plan view of the modular drive-down heavy solids separation pit 10. A stream of water, lighter solids, and free oil flows from primary solids separation section 28 over cutout dam 98 in front wall 16 at the hydraulic fill level (see hydraulic fill line 52 of FIG. 1) and into secondary solids separation section 30. The water and free oil then flow over cutout dam 100 at the hydraulic fill level and into oil separation section 32. The oil floats and collects on the surface of the water while water flows up through the standpipe of standpipe and conduit 34, and through the conduit to pump water collection section 35. Grates 58 are shown covering sections 30, 32, and 35 for safety. Handrails 38 and 60 surround the primary solids separation section 28 and the pit wall units 12 for safety.

Figure 3:
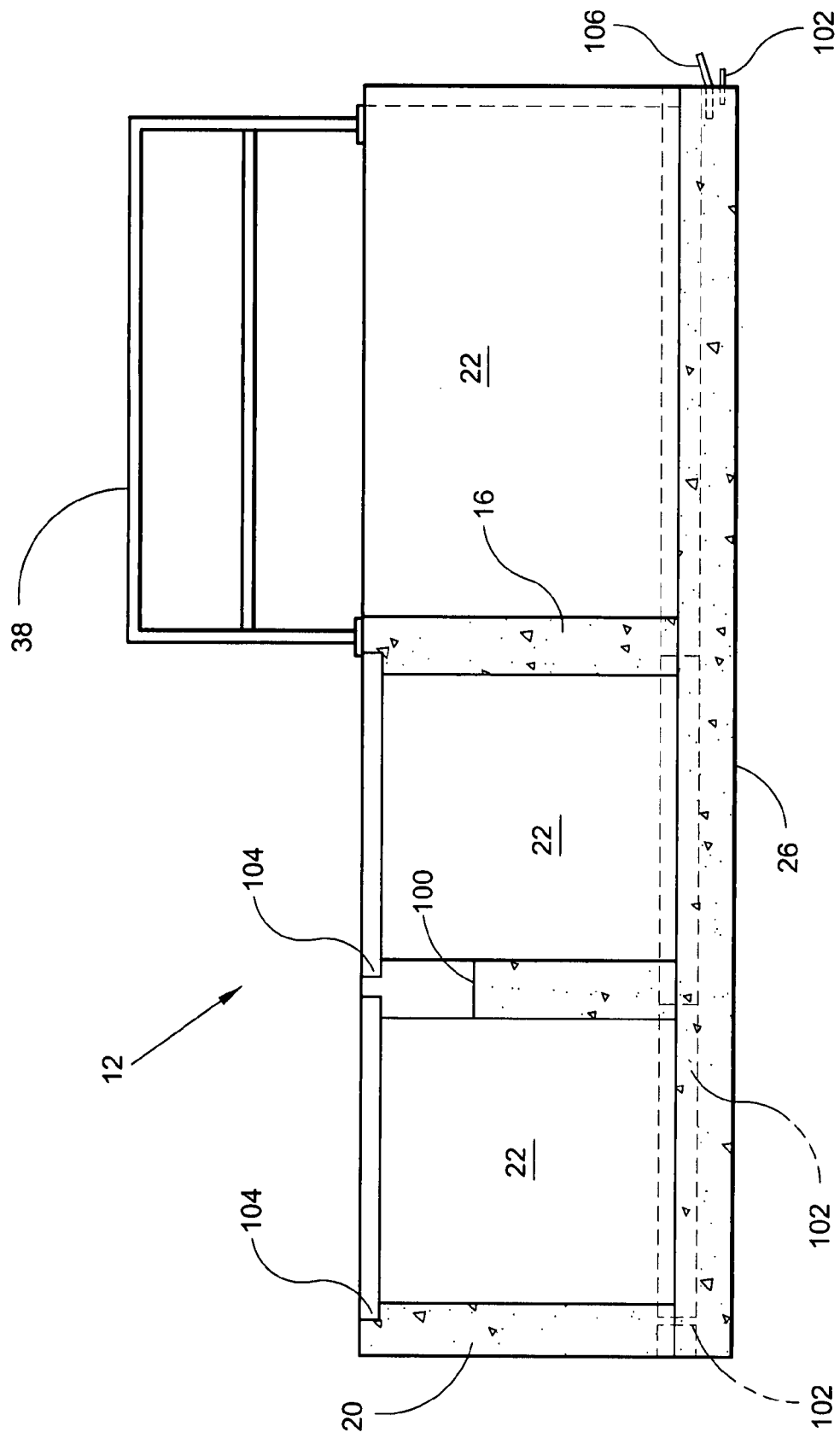
FIG. 3 is a sectional view of the water separation unit of FIG. 1.

Referring to FIG. 3, there is shown a sectional view of the water separation unit 12. The oil separation section feed cutout dam 100 is shown providing access between secondary solids separation section 30 and oil separation section 32. Separation unit grating ledges 104 are shown cut into walls 16, 18, 20 and sidewall 22. Water block strips 102 are shown as hidden lines between the floor 26 and outer walls including rear wall 20 and sidewalls 22. Another water block strip 102 is embedded in the floor 26 at connection joint 50 (see FIG. 1). A series of spaced rebar connections 106 are embedded in floor 26 at points spaced above water block strip 102 (see FIG. 4C). These rebar connections 106 may be located above the water block element 102 as an alternative. The floor of concrete ramp 46, when poured, surrounds the water block strip 102 forming a waterproof joint. Rebar may be attached to rebar connection 106 and extended at an angle upward to reinforce the ramp 46 when poured with cement. This rebar may be attached at right angles to the crosswise rebar described as attached to ramp rebar connectors 43 as discussed above (see FIG. 1).

Figure 4B:
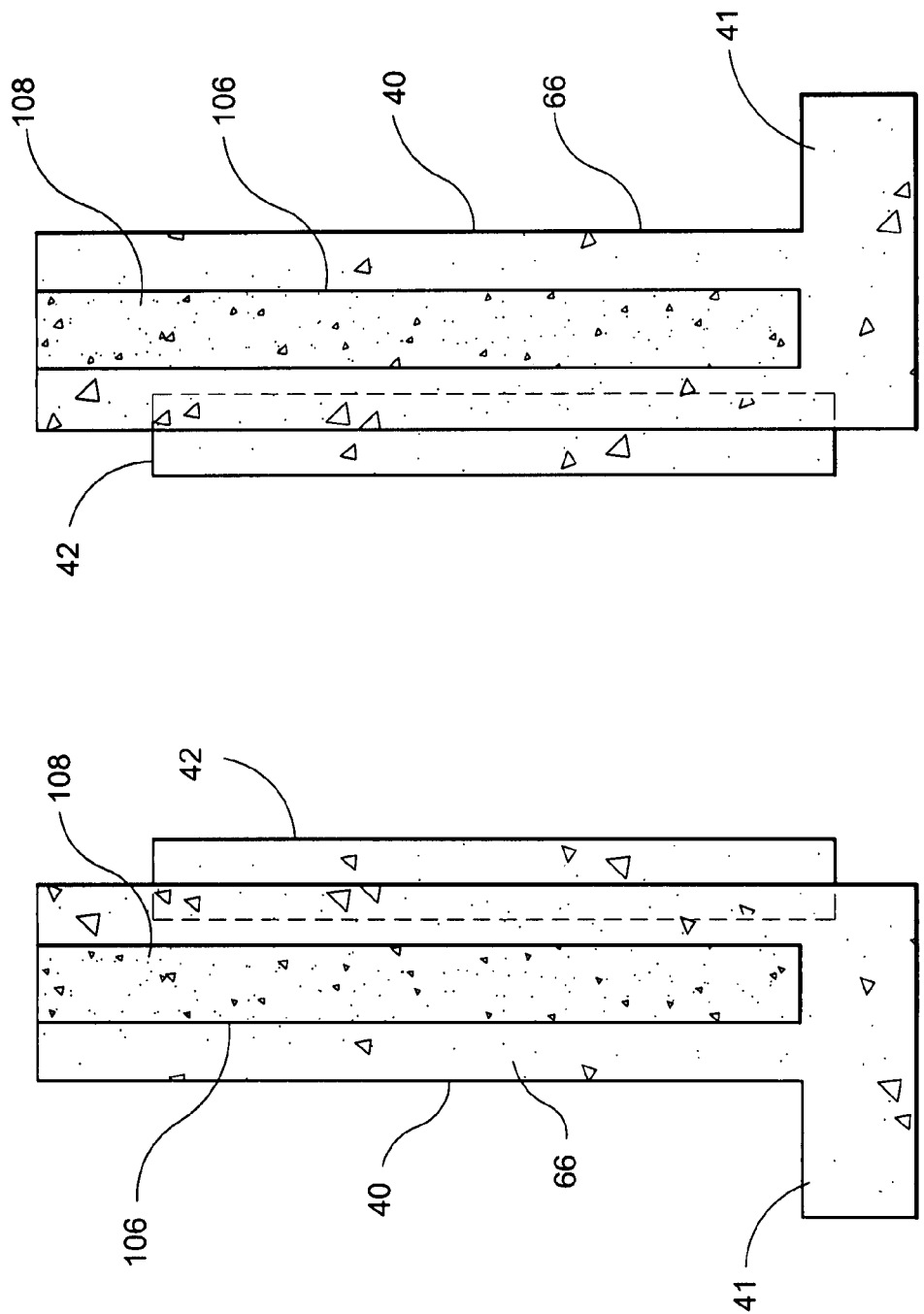
FIG. 4B is an end view of the drive-down pit wall units of FIG. 1.
Figure 4C:
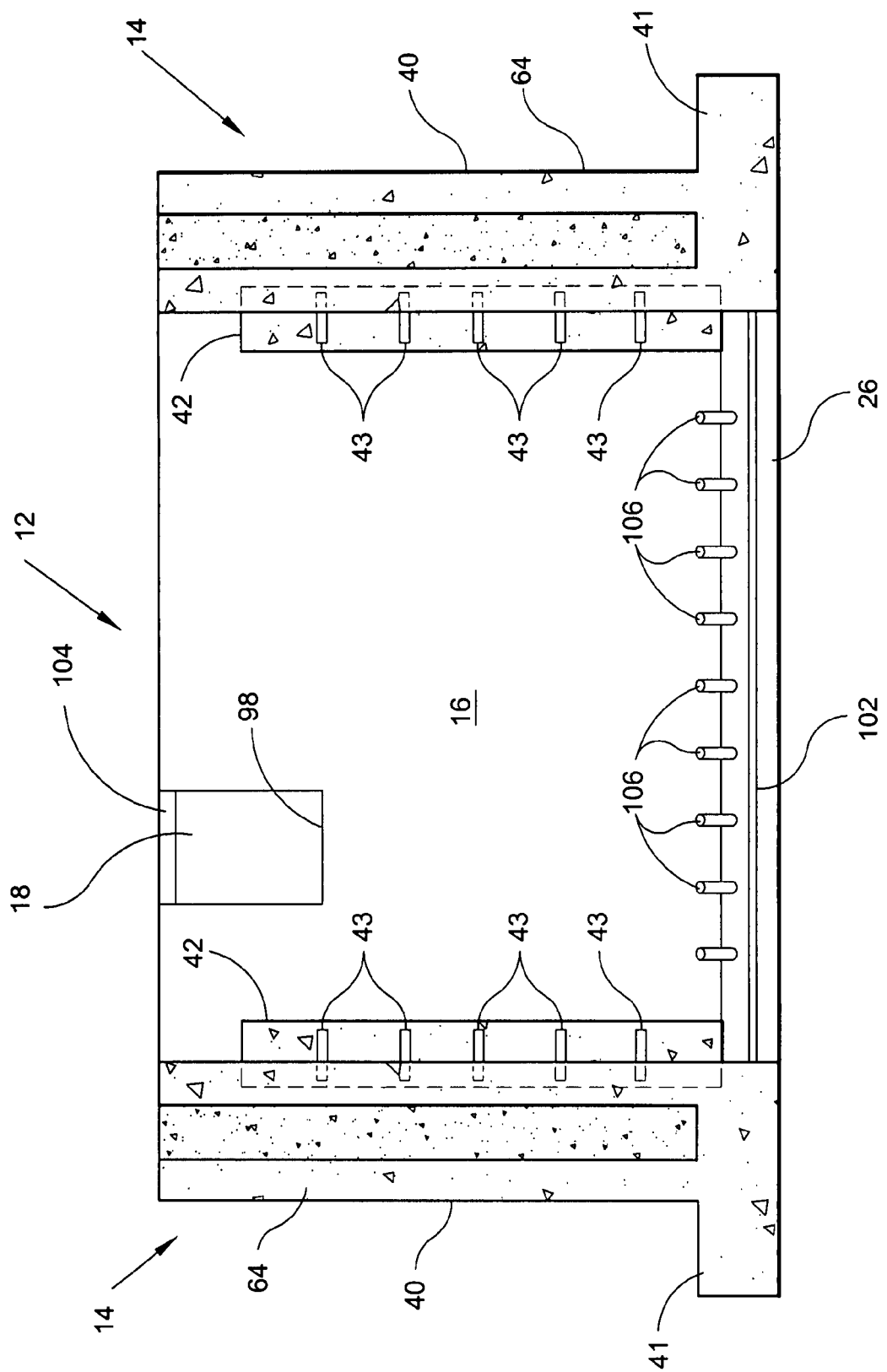
FIG. 4C is a front elevation view of the pit wall units and water separator unit as joined and before construction of ramp.
Figure 5:
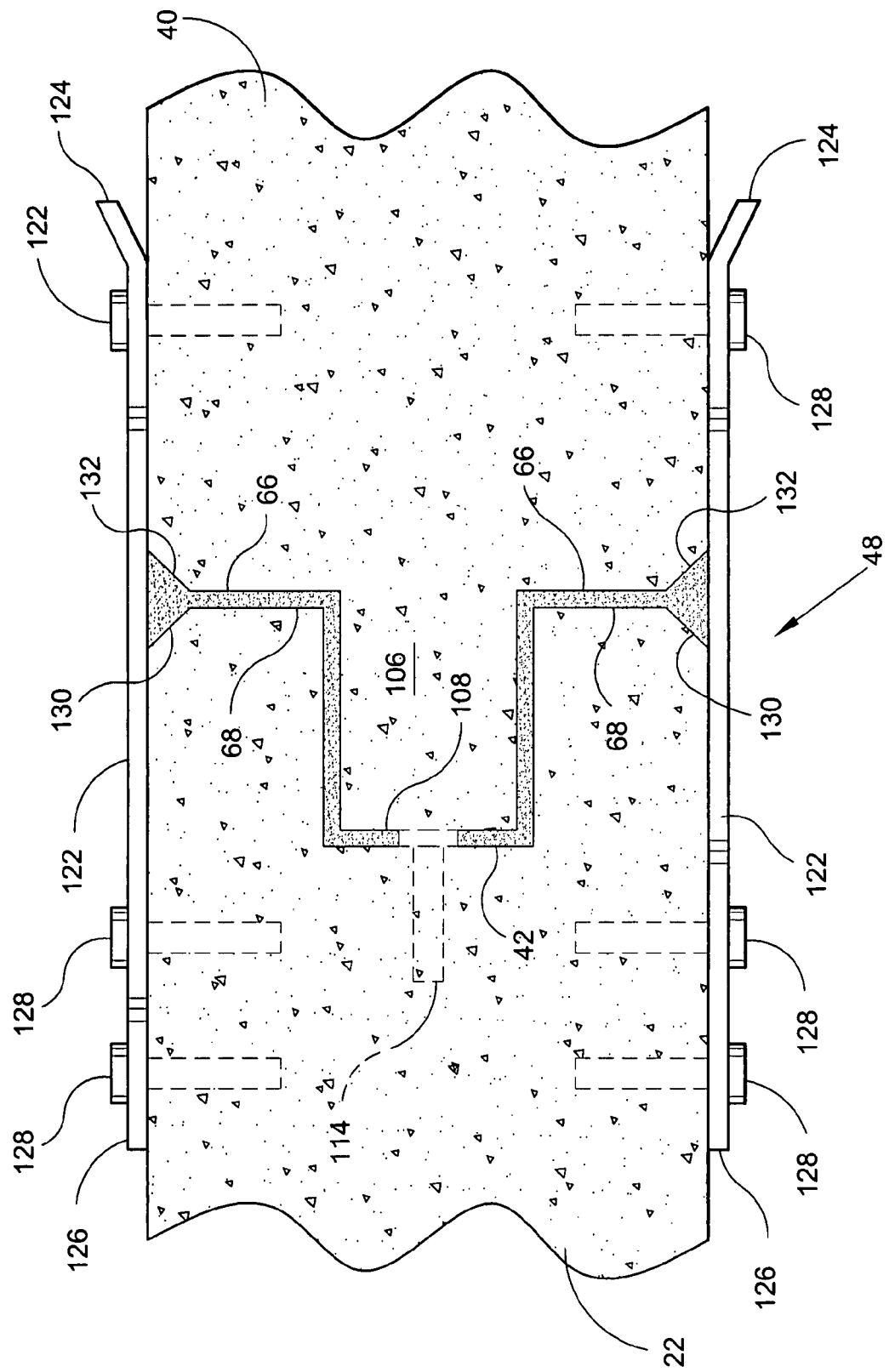
FIG. 5 is a detail view of the connection of the water separation unit and the drive-down pit wall unit of FIG. 1 in plan view.

Referring to FIGS. 4A-4C and FIG. 5, there is shown a side elevation view illustrating the wall connection 48, a rear elevation view of the spaced pit wall units 14, a front elevation view of the assembled pit wall units 14 and separation unit 12 as assembled, and a detail plan view of the wall connection 48, respectively. As seen in FIGS. 4A and 5, each wall 40 of pit wall units 14 has a tongue 108 extending rearwardly along its rear end 66. Separation unit sidewalls 22 each have a groove 112 at its forward end 68. Groove 68 extends to the floor 26 of separation unit 12. Steel skid plates 118 are located below the joint to allow easy assembly of tongue 108 into groove 112. Spacing bolts 114 are imbedded into groove 112, the heads of which act as spacers within the joint 48 for sealant 134.

Steel securing guide straps 122 are mounted on opposite sides of each wall 22 and extend forwardly from separation unit sidewall forward ends 68 having flared guide ends 124 for receiving and centering walls 40 of pit wall units 14. Guide straps 122 are mounted into walls 22 by securing bolts 128. Once walls 40 are mated with walls 22, additional securing bolts 128 are introduced through guide straps 122 and secured into walls 40. Chamfers 130 at the outer corners of walls 22 and chamfers 132 at the outer corners of walls 40 expedite the introduction of sealant 134 to form a waterproof joint 48.

As best seen in FIG. 4C, water block strips 102 are embedded in the front end of floor 26 and extends between footers 41 of sidewalls 40. Also, rebar connections 106 are embedded in the front end of floor 26 and extend forward and upward therefrom. The rebar connections are spaced along floor 26 between footers 41 of sidewalls 40. The rebar connections 43 are embedded in walls 40 and spaced below embedded water blocks 42 of pit wall units 14. Cutout dam 98 in water separation unit front wall 16 establishes the hydraulic level (see FIG. 4) and allows water, free oil, and finely dispersed solids to pass from the primary solids separation section into the next secondary solids separation section.

Figure 6:
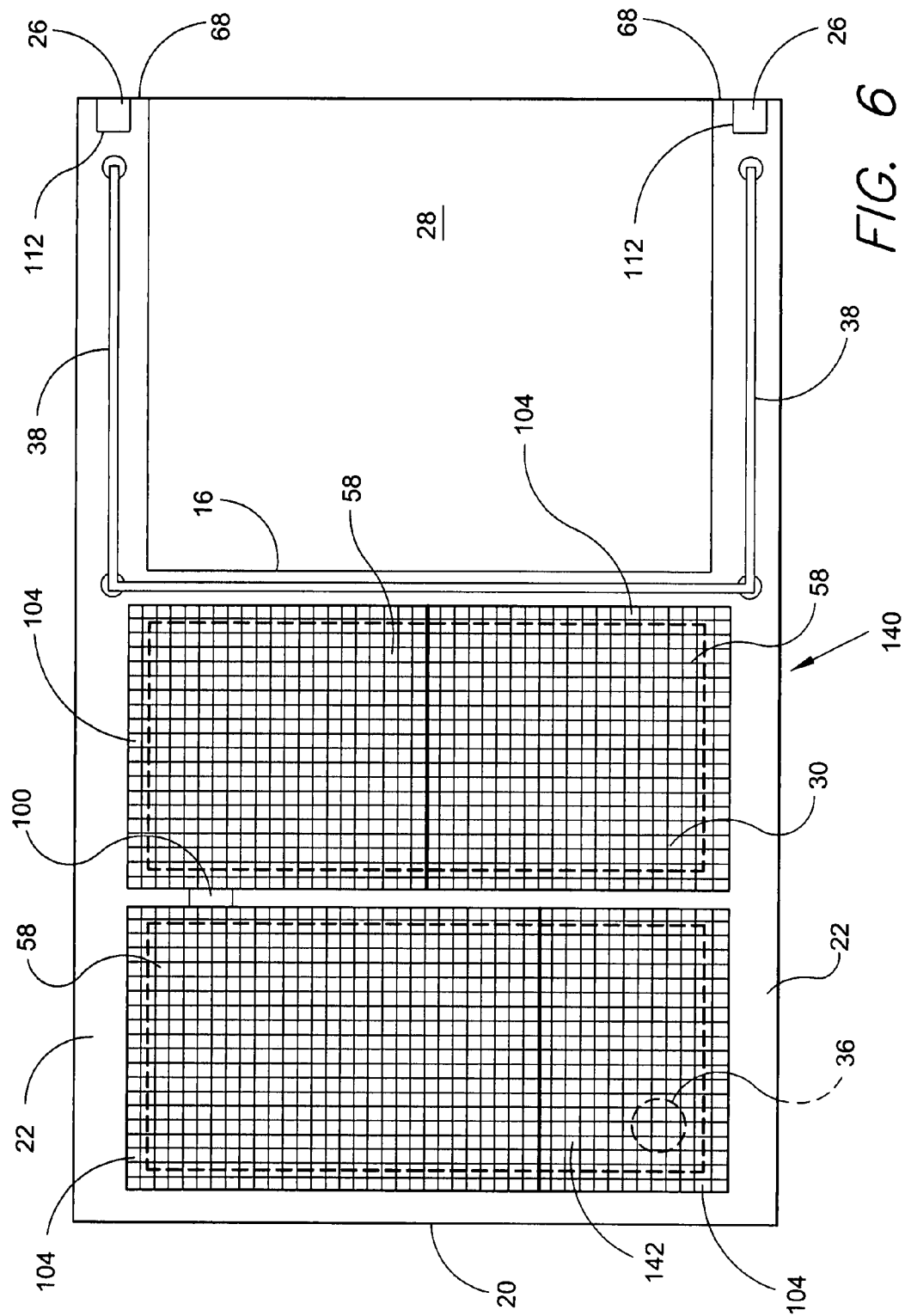
FIG. 6 is a plan view of another embodiment of the water separation unit of the invention.

Referring to FIG. 6, there is shown a plan view of another embodiment of the water separation unit of the present invention referred to by the reference No. 140. Water separation unit 140 is identical in construction and features as water separation unit 12 described above with the exception that there is a single section 142 acting as a free oil separation section and a pump water collection section, the pump 36 being at the side opposite the feed cutout dam 100. There is no wall comparable to the rear longitudinal wall 24 and no standpipe and conduit 34 as in the water separation unit 12. Enzyme tablets or skimming is used for free oil removal and the submerged pump 36 pumps treated water from the lower portion of the section 142. A large grate 58 covers the entire oil separation and pump water section 142.

Figure 7:
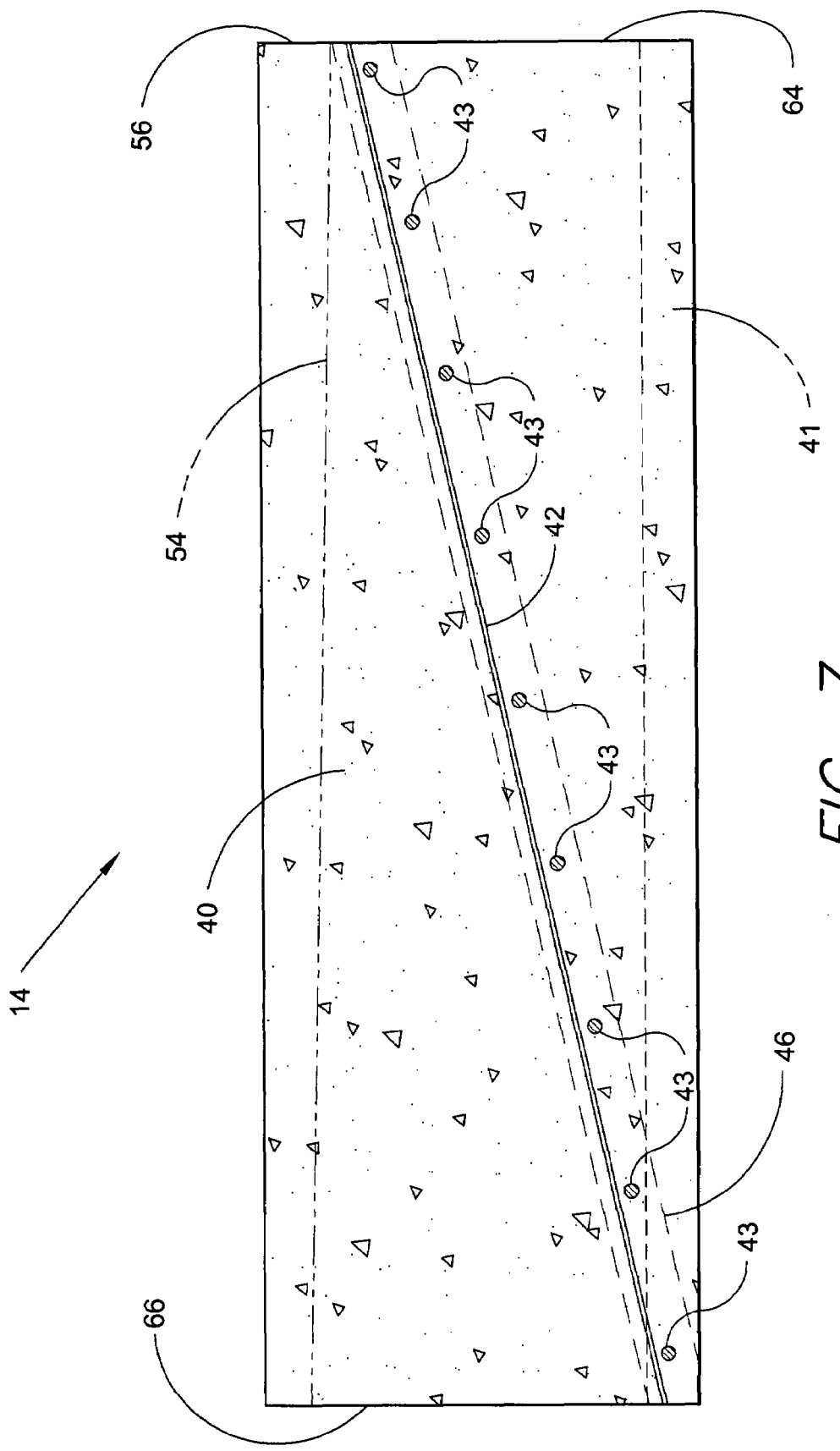
FIG. 7 is a side elevation view of the drive-down pit wall unit of FIG. 1.

Referring to FIG. 7, there is shown a side elevation view of the inner side of wall 40 of a pit wall unit 14. Waterblock 42 is embedded in cement wall 40 and slopes downward from wall forward end 64 to wall rear end 66. Imbedded rebar connectors 43 are shown spaced along and under waterblock 42. The concrete ramp 46 to be poured is shown in ghost lines. The washpad grade line 54 leads to the wash water runoff entry 56.

Figure 8:
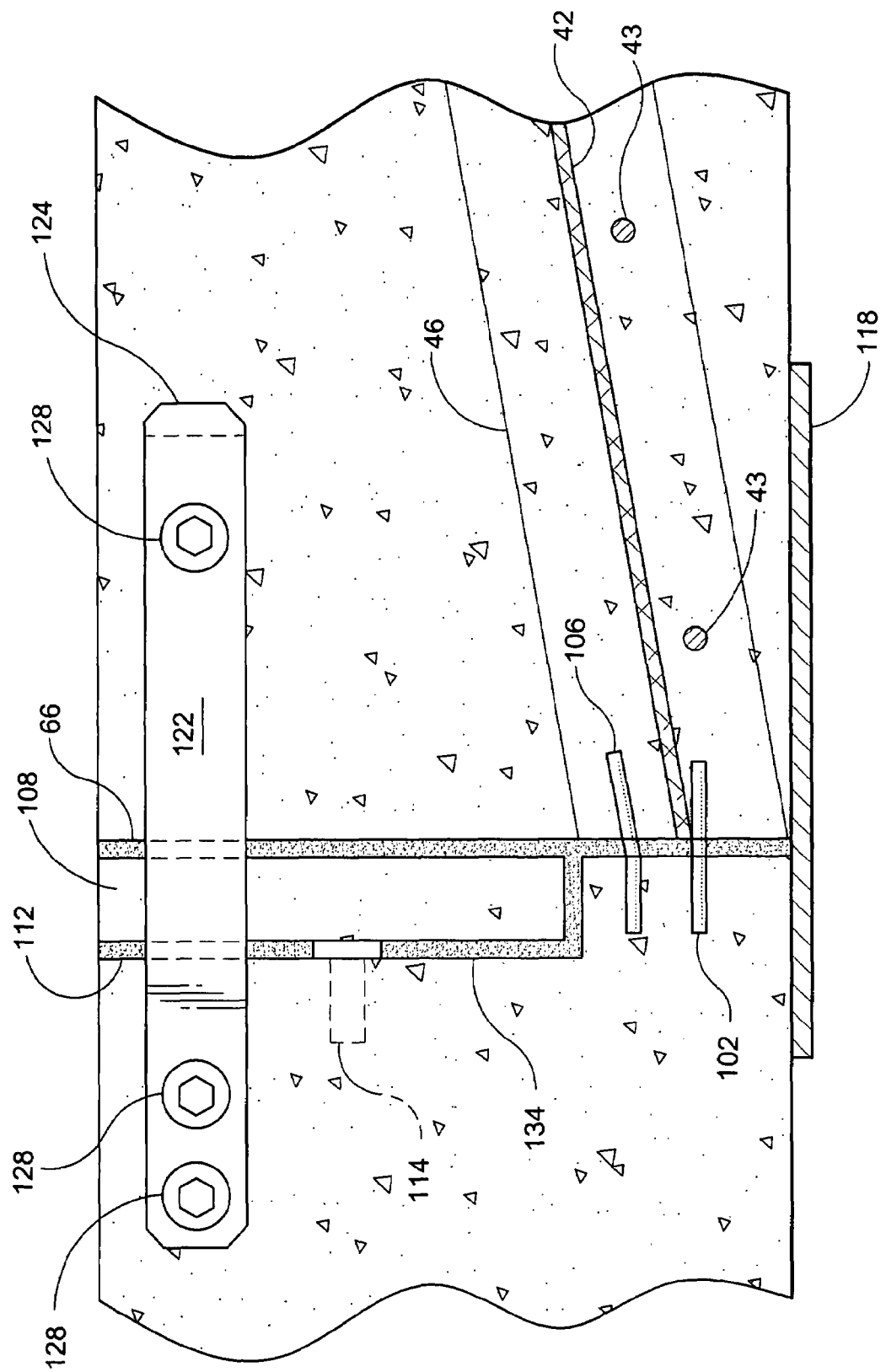
FIG. 8 is a diagrammatic detail view in elevation of the finished connection between the water purification unit, the drive-down pit wall unit, and the poured ramp of FIG. 1 as joined.

Referring to FIG. 8, there is shown a diagrammatic detail view of the completed joints 48 and 50 of FIG. 1. Concrete ramp 46 has been poured with waterblock strip 42 and rebar connection 43 extending into the poured concrete ramp 46. Waterblock strip 102 is recessed in the forward edge of separation unit floor 26 (see FIGS. 3 and 4C) and the extreme rear end of waterblock strip 42 bears against strip 102 to form a waterproof joint. Rebar connector 106 is embedded in the forward edge of separation unit floor 26 and engages the poured concrete ramp 46 (connected rebar extending from rebar connectors 43 and 106). Sealant 134 surrounds tongue 108 on three sides and then extends inward and outward between wall rear end 66 and separation unit tongue receiving groove separation unit sidewall forward ends 68 (see FIG. 5). The head of spacing bolt 114 provides spacing for sealant 134. Securing guide straps 122 secure sidewall 22 to wall 40.

Figure 9:
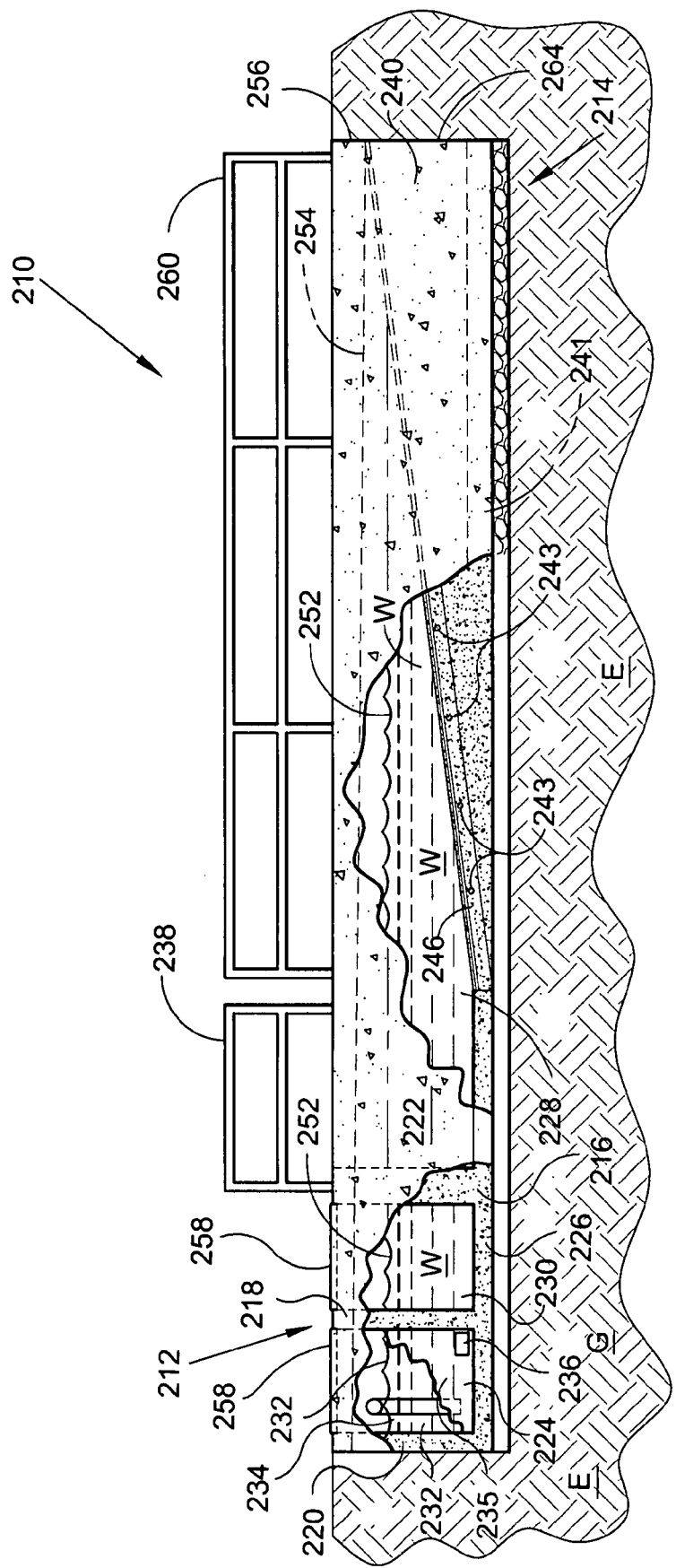
FIG. 9 is an environmental side elevational view, partially broken away, of another embodiment of the present invention.
Figure 10:
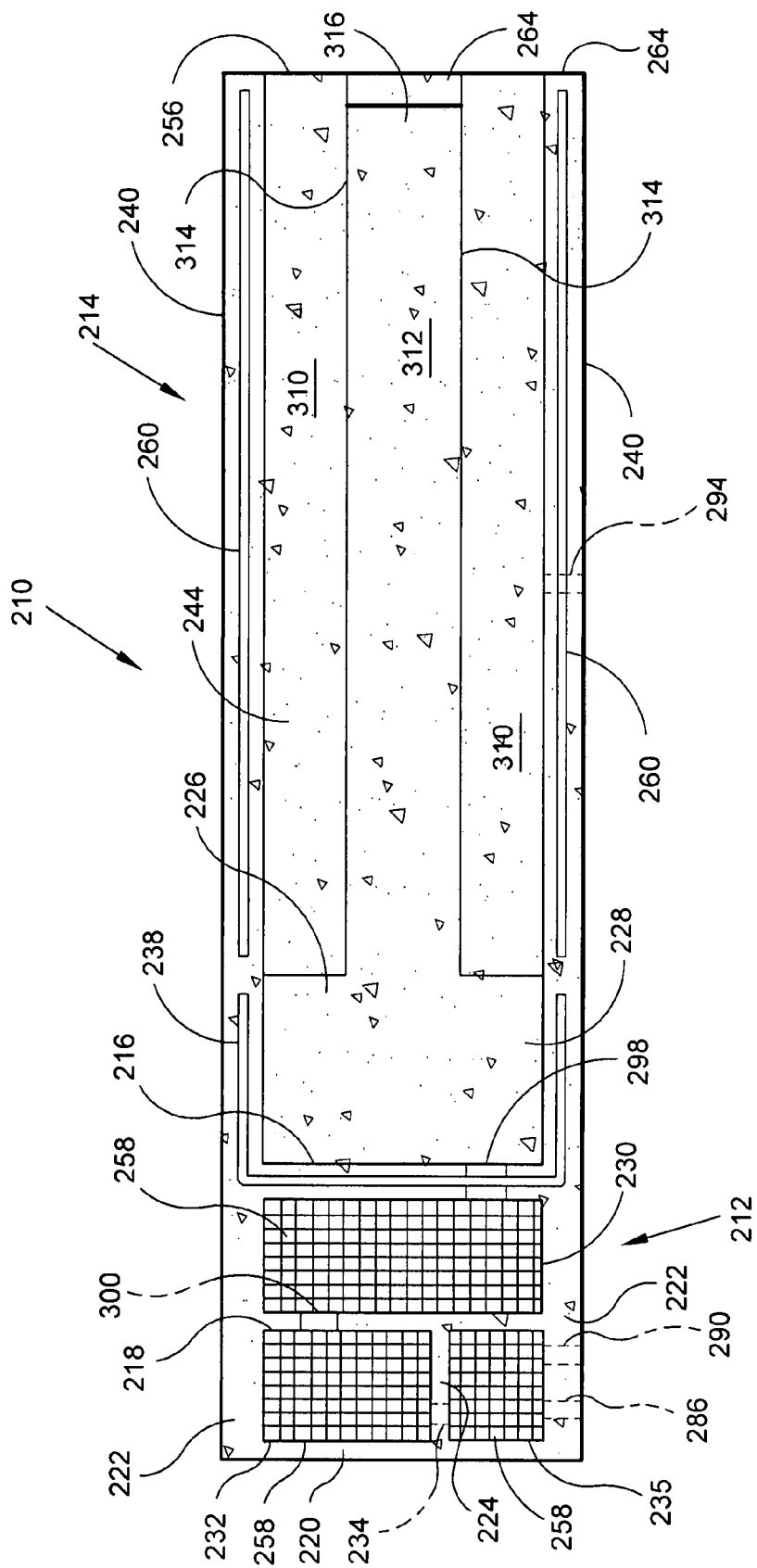
FIG. 10 is a plan view of the embodiment of FIG. 9.

Referring to FIGS. 9 and 10, there is shown a side elevation view, partially broken away, and a plan view, respectively, of another embodiment of the drive-down pit system of the present invention as installed, which is pre-cast as a single unit generally referred to by the reference No. 210. Unitary drive-down pit system 210 includes a generally rectangular separation section 212 and a drive-down section 214. Water separation section 212 has a front wall 216, an intermediate wall 218 and a rear wall 220, all between sidewalls 222. Sidewalls 222 extend equally and substantially forward of separation section front wall 216. A rear longitudinal wall 224 is parallel to and spaced from sidewalls 222, extending between intermediate wall 218 and rear wall 220. Separation section 212 has a horizontally disposed floor 226.

The forward portions of sidewalls 222 and floor 226 define a primary solids separation section 228 for separating heavy components from the wash runoff water entering pit 210 through settling. The front wall 216, intermediate wall 218, sidewalls 222, and floor 226 define secondary solids separation section 230 for separating finer dispersed solids from the water through settling. Rear longitudinal wall 224 separates the section formed defined by intermediate wall 218, rear wall 220, sidewalls 222 and floor 226 into an oil separation section 232 and a sump pump section 235.

An oil separation standpipe and exit conduit 234 extends from a point proximate the floor of oil separation section 232 and connects oil separation section 232 with sump pump section 235 at hydraulic level 252. A submersible pump 236 is located in sump pump section 235 for removal of the pretreated water from the pit system 210. Water separation section 212 has a handrail 238 extending along the upper surface of sidewalls 222 and front wall 216 to surround primary solids separation section 228.

For construction purposes, rebar loops or the like (not shown) may be embedded as attachments for grasping by a crane in the upper wall surfaces of the water separation section and the drive-down section 214. These attachments may by cut away after installation.

Drive-down section sidewalls 240 extend forward from the front portions of separation section sidewalls 222, and drive-down section floor 241 extends forward from the front portion of separation section floor 226 see FIG. 10). Imbedded rebar 243 is shown reinforcing ramps 246 and may be employed throughout the structure of unitary drive-down pit 210 as desired. Drive-down section ramps 246 extend inward from sidewalls 240 and are spaced by drive-down void section 312 forming inner ramp sidewalls 314 extending upward from drive-down void floor 316. Drive-down section ramps 246 slope downward from wash pad entry 256 in drive-down front wall 264 ending at separation section 212. Drive-down section void floor 316 extends rearward from front wall 264 and joins separation section floor 226. Drive-down void section 312 reduces the weight and materials requirements of the unitary pre-cast separation pit 210. The treads or tires of a front load vehicle bridge the drive-down void section 312 and are supported by drive-down ramps 246 during vehicle entry, solids removal, and vehicle exit. The gradation of the wash pad is shown in hidden line 254 along the upper portion of unitary drive-down pit 210. Each pit wall 214 has a handrail 260 extending along its respective upper edge. Water runoff from the wash pad enters the pit 210 at runoff water entry 256. Separation unit cover grates 258 cover the secondary solids separation section 230, the oil separation section 232, and the sump pump section 235.

Referring more particularly to FIG. 10, a stream of water, lighter solids, and free oil flows from primary solids separation section 228 over cutout dam 298 in front wall 216 at the hydraulic fill level (see hydraulic fill line 252 of FIG. 9) and into secondary solids separation section 230. The water and free oil then flow over cutout dam 300 at the hydraulic fill level and into oil separation section 232. The oil floats and collects on the surface of the water while water flows up through the standpipe of standpipe and conduit 234 and through the conduit to sump pump water collection section 235. Grates 258 are shown covering sections 230, 232, and 235 for safety. Handrails 238 and 260 surround the primary solids separation section 228 and the drive-down section 212 for safety.

Pump electrical service line aperture 286, pump water line aperture 290 and secondary solids section feed conduit 298 are optionally pre-cast in unitary drive-down pit 210 to serve the same functions as electrical service line aperture 86, pump water line aperture 290, and secondary solids section feed conduit 98 as described above in the embodiment of FIG. 2b.

Figure 11:
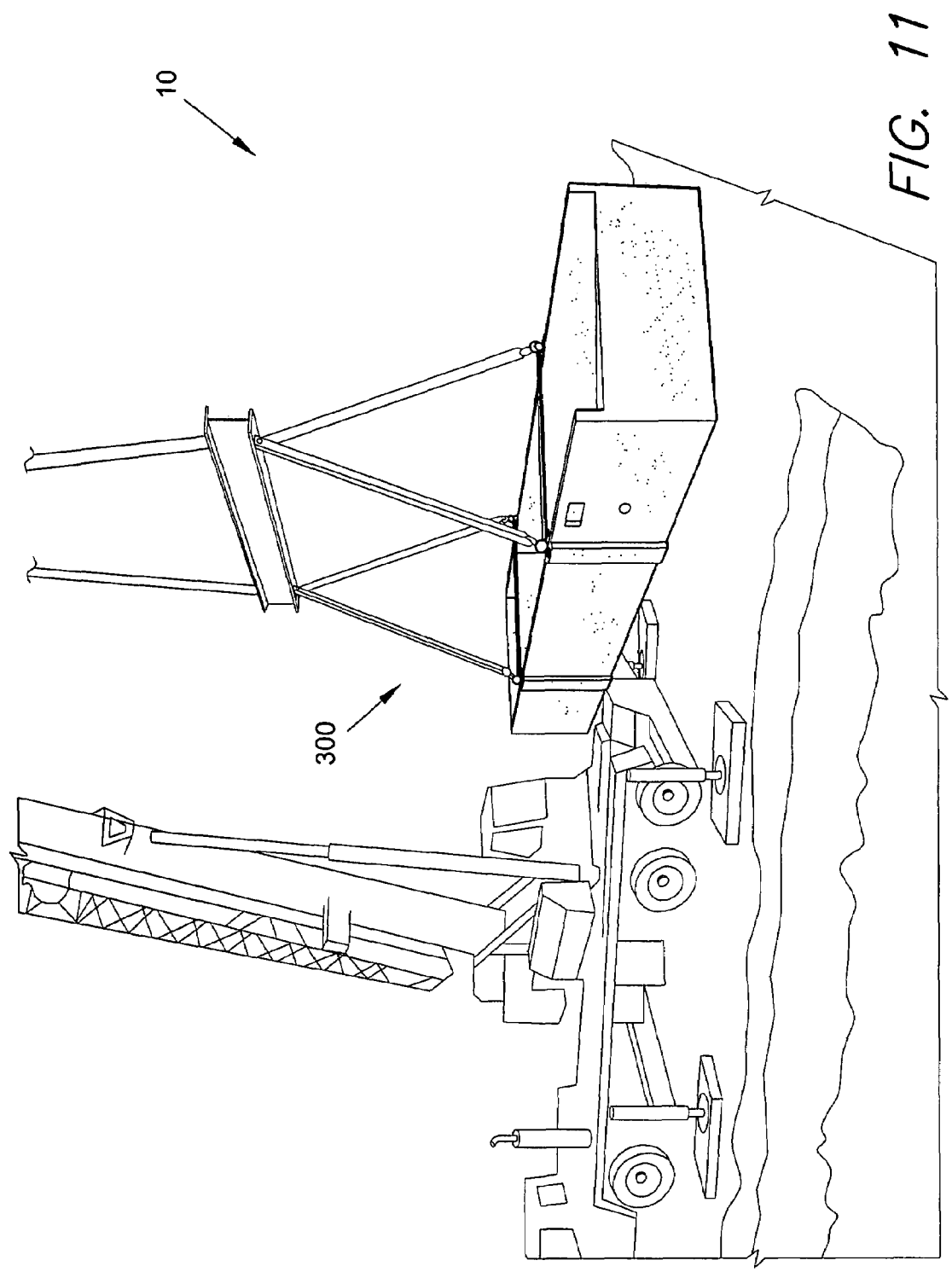
FIG. 11 is an environmental, perspective view of a third embodiment of a pre-cast drive down unit according to the present invention.
Figure 12:
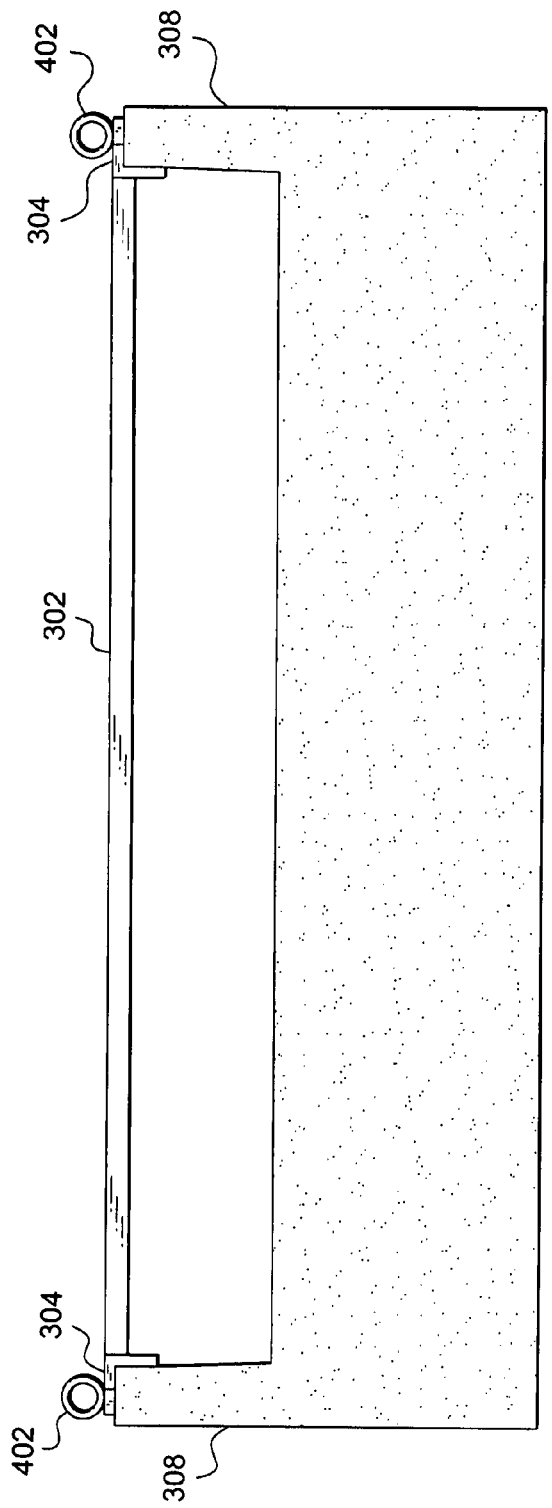
FIG. 12 is an end view of a third embodiment of a pre-cast drive down unit according to the present invention.
Figure 13:
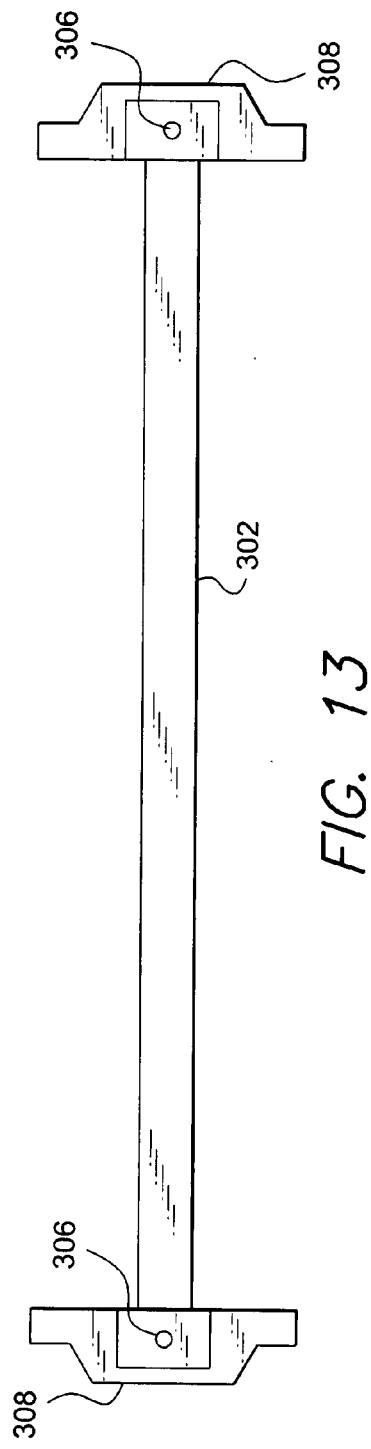
FIG. 13 is a top view of a lifting of a third embodiment of a pre-cast drive down unit according to the present invention.
Figure 14:
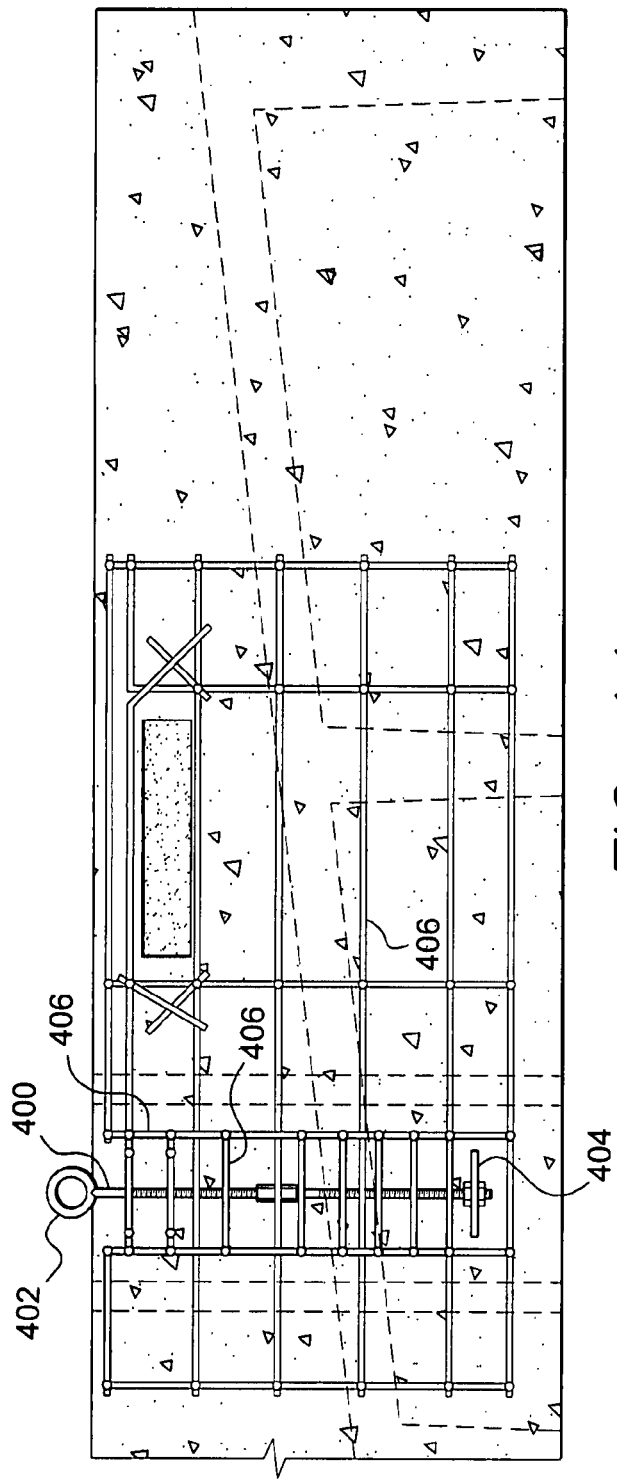
FIG. 14 is a partial sectional view of the re-enforcement for the eye bolt and rod of a third embodiment of a pre-cast drive down unit according to the present invention.
Figure 15:
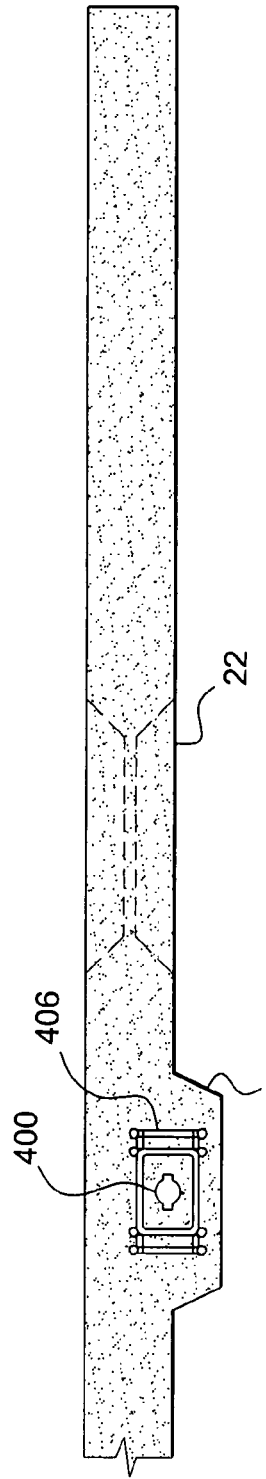
FIG. 15 is a top view of the re-enforcement for the eye bolt and rod of a third embodiment of a pre-cast drive down unit according to the present invention.

FIG. 11 is illustrative of an embodiment of the invention wherein the drive down pit system 10 is pre-cast and is provided with a lift-brace system generally indicated at 300. Lift brace system 300 allows the pre-cast drive down pit system 10 to be delivered to the wash pad site via flatbed truck or the like and hoisted into place by means of a crane. The crane must have a minimum lifting capacity of seventy tons. Drive down system 10 is provided with two lifting braces, as further described below, which braces are to remain in place at all times during the lift. The braces can be removed after the lift is accomplished. Chokers, slings, U-bolts, saddles, hitches and other conventional lifting parts are provided as needed. All lifting parts must be capable of supporting the stated loads with appropriate OSHA safety factors. Site preparation and installation can be accomplished in as little as one day's time thereby avoiding the multiple pours and inspections which add time and cost to projects where the drive down pit is built on site.

As best illustrated in FIGS. 12-15, lift brace system 300 comprises a lift brace 302 fabricated from angle iron and dimensioned to span the width of the pit. The ends of lift brace 302 terminate in an L-shaped, plate member 304. Each member 304 is disposed on a respective top edge of sidewalls 22 at a respective concrete protuberance 308 on each sidewall. Each L-shaped member 304 has an opening 306 disposed through the surface of the plate that is horizontally disposed on a respective sidewall 22 at protuberance 308. A respective threaded rod 400, having an eyebolt 402 at its upper end, extends through opening 306 and is embedded in a respective protuberance 308. Each threaded rod 400 terminates in an anchor plate 404 at its lower end. An array of vertical and horizontal rebars 406 is embedded in each protuberance and are arranged to form a cage to provide re-enforcement in each protuberance.

Figure 16:
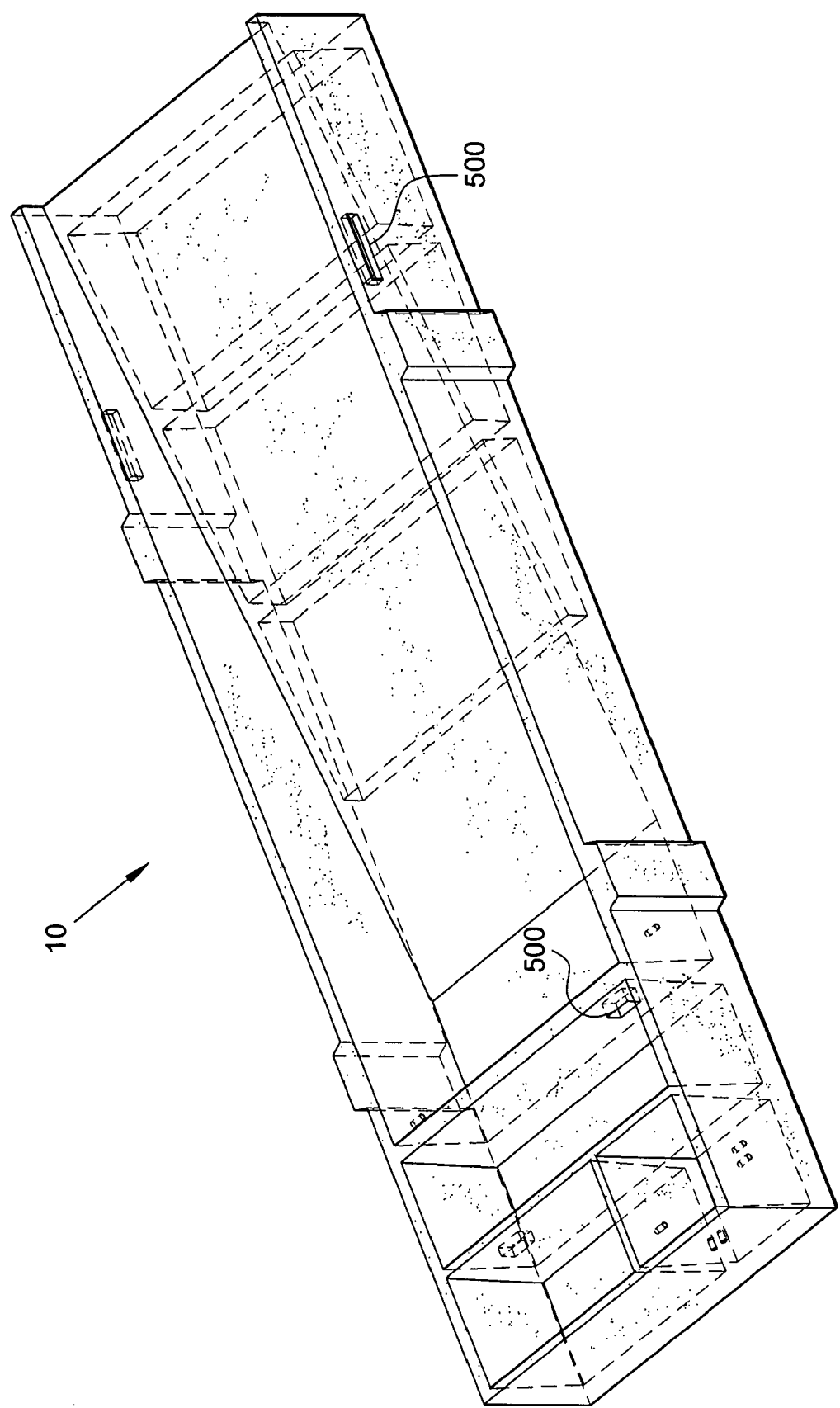
FIG. 16 is a perspective view of a third embodiment of a pre-cast drive down unit according to the present invention.
Figure 17:
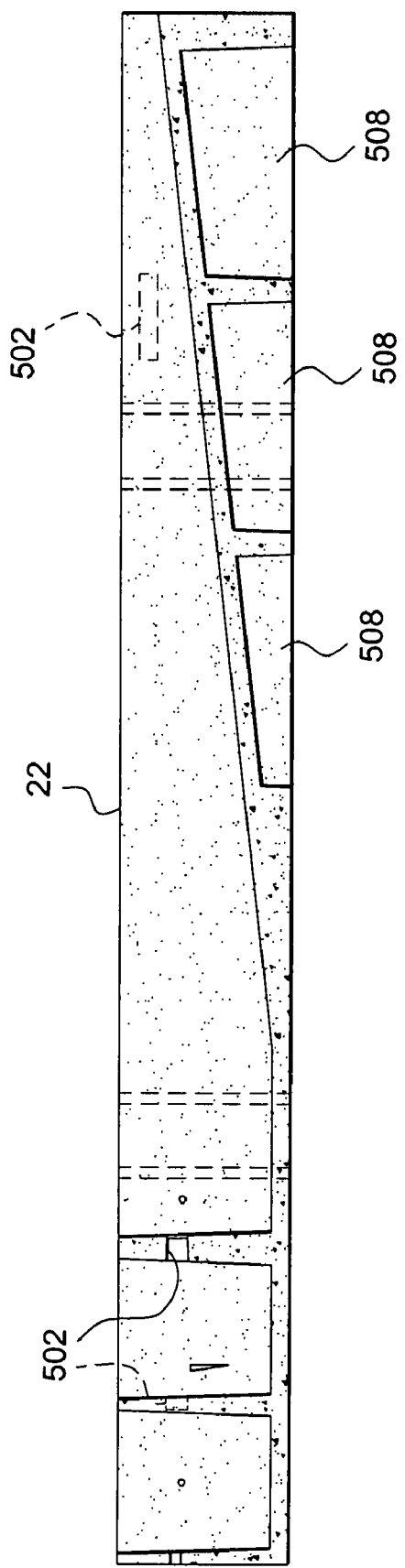
FIG. 17 is a sectional, side view of a third embodiment of a pre-cast drive down unit according to the present invention.

Attention is now directed to FIG. 16 wherein the pit system 10 is provided with openings 500 disposed in selected walls, which openings can be provided with removable plugs or knockouts 502 (FIG. 17). Knockouts 502 are kept in place to enhance stability until the pit system has been installed and the openings are ready to be employed. The openings and plugs can be pre-formed as needed.

FIG. 17 shows a cross-sectional view of the instant embodiment of pit system 10 wherein an array of cells 508 is formed on the bottom surface of drive down pit 10. The cells permit the pit to produced with less concrete thereby reducing the weight and cost. The cells also permit the pit to be better balanced.

Figure 18:
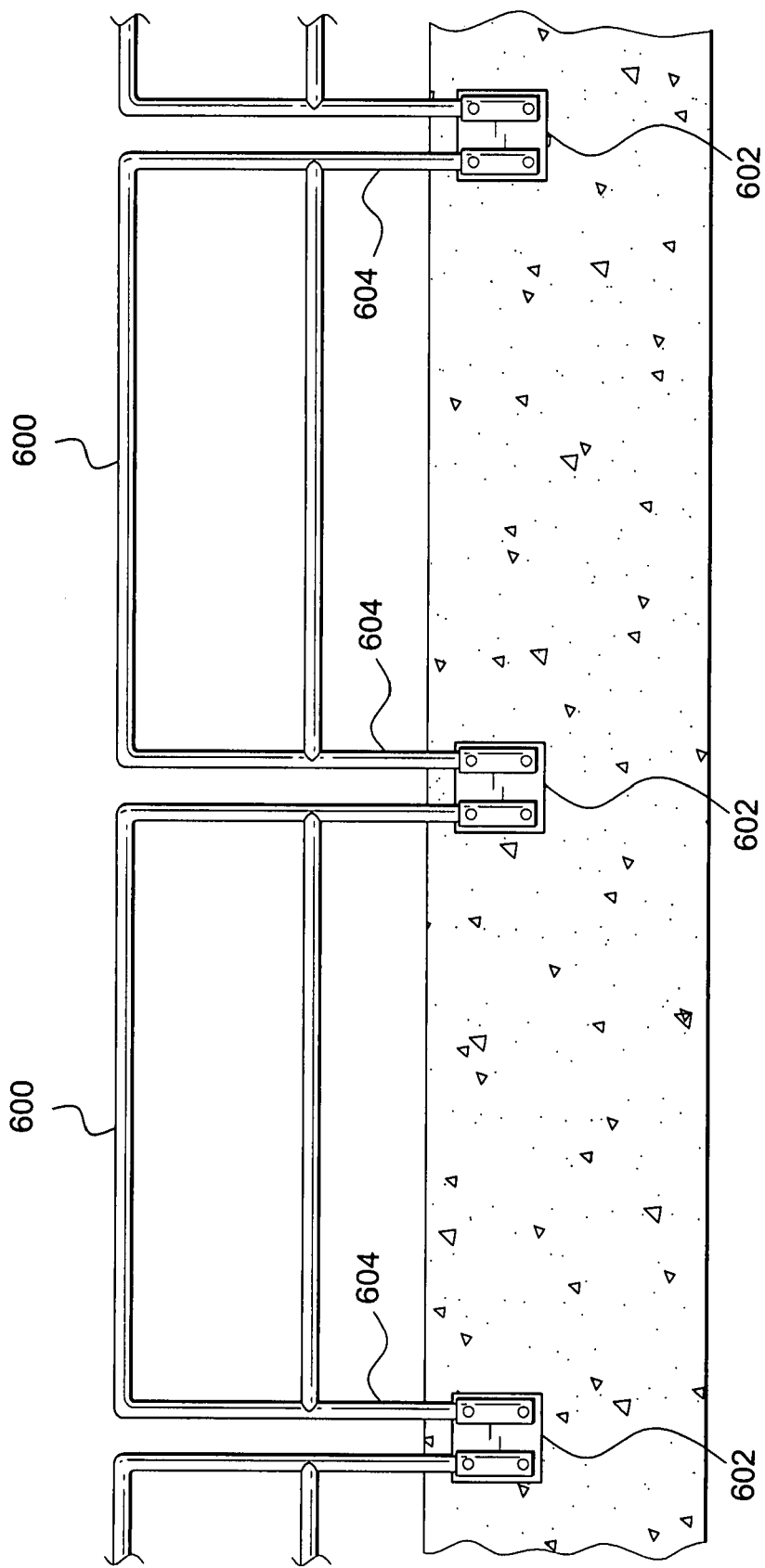
FIG. 18 is a sectional view of the safety rail and weld plate positioning of a third embodiment of a pre-cast drive down unit according to the present invention.

FIG. 18 is illustrative of an improved safety rail system for the drive down pit. Handrails 600 incorporate steel plates 602 embedded in selected walls of the drive down pit. The selected walls include the opposed sidewalls 22 and front wall 16. The vertical legs 604 of each respective rail are welded to a respective steel plate prior to the plate being embedded in the wall. This arrangement provides a sturdy and secure foothold for the rails.

Figure 19:
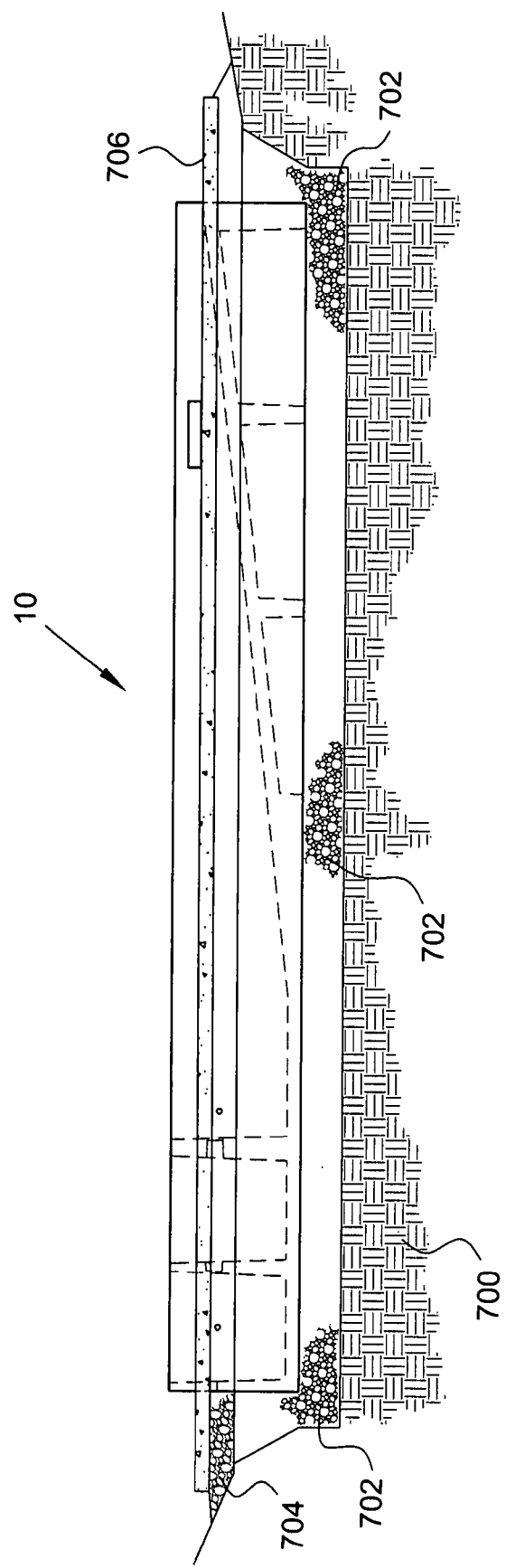
FIG. 19 is a sectional side view of the installation environment of a pre-cast drive down unit according to the present invention.
Figure 20:
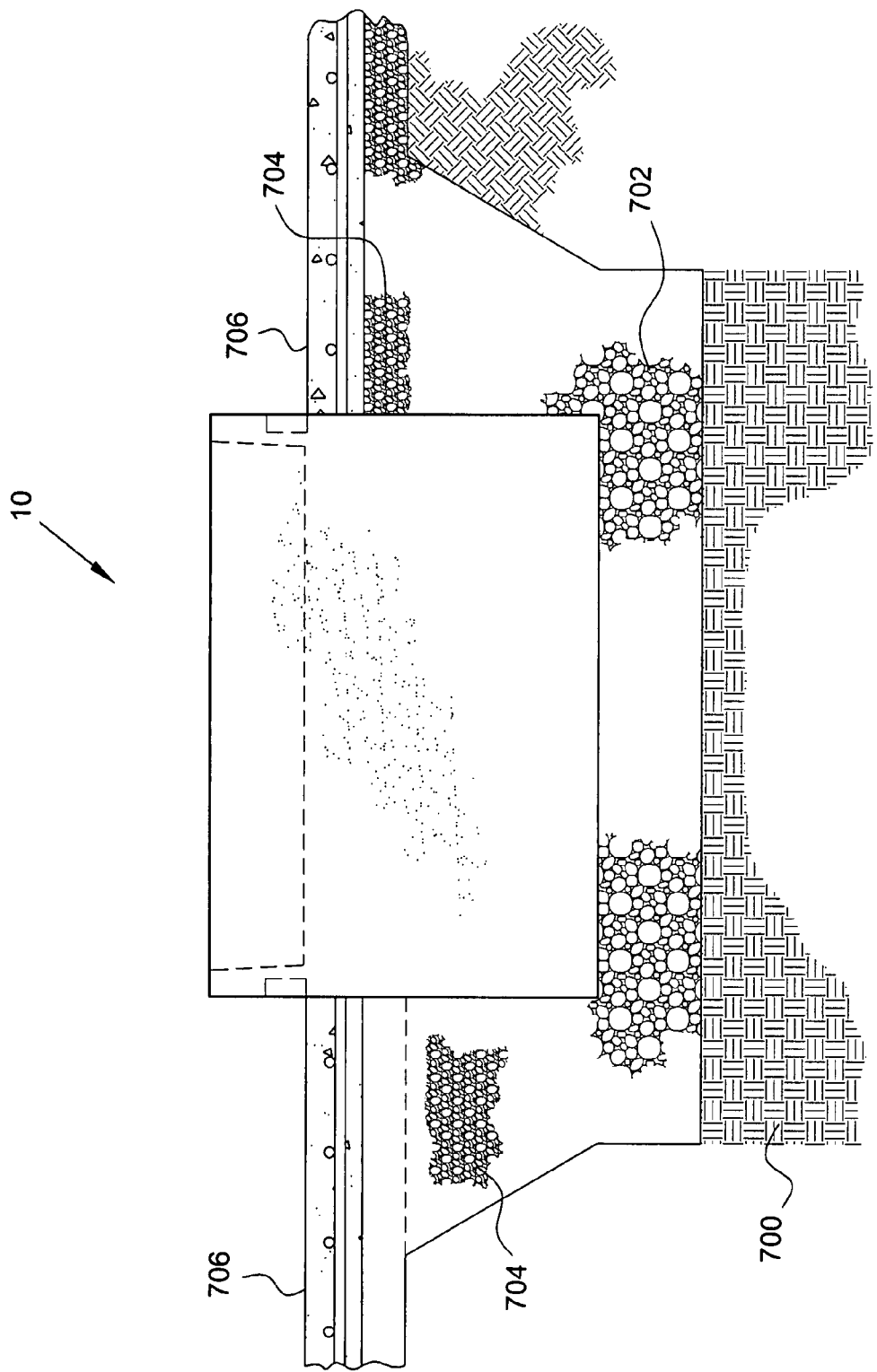
FIG. 20 is a sectional end view of the installation environment of a pre-cast drive down unit according to the present invention.

FIGS. 19 and 20 disclose the requirements of site preparation for receiving the pre-cast pit system 10. A trench of proper dimensions to receive system 10 is prepared having a compact suitable subgrade 700. System 10 rests on a stone aggregate base 702 having a depth of approximately twelve inches, which stone aggregate base is deposited on subgrade 700. Stone base 702 should be level in both directions and liquid free. As presently contemplated, stone base 702 will be placed on subgrade 700 in three four-inch layers and will comprise No. 57 stone. The void between the sidewalls of system 10 and the walls of the trench are filled with gravel 704 to distance of about six to eight inches above grade. A reinforced concrete slab 706 is disposed to surround system 10 and rest on gravel bed 704. The top of slab 706 is aligned with the side entry ports of system 10 and slopes toward the ports at a minimum of ⅛" per foot. The edge of the slab will be a minimum of four inches above grade.

FIGS. 21-23 illustrate the placement of rebar inserts in the concrete slab. The rebar inserts 800 are positioned adjacent the perimeter of system 10 (only one side shown) and extend into the slab 706. The rebar inserts are used as a gauge to establish the slope and grade of the concreter slab. As contemplated, seven rebar inserts 800-806 will be employed at each respective side of the system and three respective inserts 807-809 and 901-902 are employed at each end. Insert 800 is disposed approximately ten inches from the top of slab 706. Inserts 801-804 slope uniformly downward at approximately one inch intervals. Inserts 804 and 805 are at the same level. Insert 806 is approximately two inches above insert 805. At one end (FIG. 22), inserts 807-809 are all approximately ten inches below the top of slab 706.

As an example, the overall length of the pit may be 432" with a water separation unit length of 144" and pit wall unit lengths of 288". The overall height of the pit is 48" and the width is 101". The water separation unit has a floor, front wall, intermediate wall and rear wall of 6" in thickness. The water separation unit sidewalls are tapered walls. The ramp has a slope of 1¼" per lineal foot. The wash pad grade has a slope of ⅛" per liner foot.

The length of the primary solids separation section is 54". The length of each of the secondary solids separation section, the free oil separation section, and the pump water collection section is 36", respectively. The width of the primary and the secondary solids separation sections is 86", respectively. The free oil separation section is 4' 10" and the pump water collection section is 30" in width, respectively. The steel skid plates under each pit wall joint is ½"×12"×24" steel plate. The tongue of the pit wall joint is 2½" in width by 3" in length by 41¾" in height and extends to the top surface of the pit wall unit.

The depth of the groove in the forward ends of the water separation unit sidewalls is 3" and the height is 42". The grate size of the secondary solids separation section is 39½ by 89½". The spacer bolts are ½"×1½" hex head bolts having heads of ¼" in thickness, providing for ¼" joint sealant space. The rebar is #6 rebar. The water block is plastic or robber strip of 4" width by ¼" thickness. The footers of the pit wall units extend 6" outward from the foot of the walls and are 6" in height, extending the length of the pit wall units. The hydraulic level in the pit is 24" above the floor of the water separation unit and the section feed cutout dams are 24" above the floor. The water entrance to the pit is 11" below the top surface of the pit wall units. The poured surface of the ramp is six inches in thickness. The joint securing guide straps are 18"×2"×¼" steel.

In the operation of the pit, solids collected in the primary solids separation section is periodically removed by scooping with the scoop of a tractor as described above. The secondary solids separation section is emptied of collected fines be a pit cleaner suction device that transfers the collected fines to the primary solids separation unit. Enzyme tablets used to consume the collected oil are, for example, Biopucks, available from Landa cleaning systems, Camas, Wash.

It is to be understood that the present invention is not limited to the embodiments described above, but encompasses any and all embodiments within the scope of the following claims.

We claim:

1. A pre-cast, modular, drive-down pit system for water separation, comprising:
    a pre-cast water separation unit comprising:
    opposing sidewalls having forward ends;
    a floor coextensive with said sidewalls and having a forward end; said floor having a bottom surface;
    a front wall extending between said sidewalls and spaced rearward of said sidewall forward ends;
    an intermediate wall extending between said sidewalls and spaced rearward of said front wall;
    a rear wall extending between said sidewalls and spaced rearward of said intermediate wall;
    said sidewalls, said floor and said front wall defining a primary solids separation section;
    said sidewalls, said floor, said front wall and said intermediate wall defining a secondary separation section;
    said front wall defining a cutout dam for flow of water from said primary solids separation section to said secondary solids separation section;
    said sidewalls, said floor, said intermediate wall and said rear wall defining an oil and water separation and pump water collection section;
    said intermediate wall defining a cutout dam for flow of water from said secondary solids separation section to said oil and water separation and pump water collection section;
    opposing pre-cast pit wall units having forward ends and rear ends;
    said opposing pit wall units being connectable at their rear ends with respective said forward ends of said sidewalls of said water separation unit, said opposing pit wall units defining a drive-down ramp section;
    apparatus for lifting said pre-cast, modular, drive-down pit system, said apparatus mounted on said opposing side walls; and
    an array of protuberances formed on said opposing side walls and wherein said apparatus for lifting is mounted at said array of protuberances.

2. The system of claim 1, wherein said apparatus for lifting includes a pair of lift braces mounted on said opposing side walls.

3. The system of claim 2, wherein each lift brace has a first end and a second end and wherein a respective L-shaped plate is attached at each first end and each second end.

4. The system of claim 1, including a safety rail system mounted on selected walls of said pre-cast, modular, drive-down pit system, said safety rail system having ends attached to steel plates and wherein said steel plates are embedded in said selected walls.

5. A pre-cast modular, drive-down pit system for water separation, comprising:
    a pre-cast water separation unit comprising:
    opposing sidewalls having forward ends;
    a floor coextensive with said sidewalls and having a forward end; said floor having a bottom surface;
    a front wall extending between said sidewalls and spaced rearward of said sidewall forward ends;
    an intermediate wall extending between said sidewalls and spaced rearward of said front wall;
    a rear wall extending between said sidewalls and spaced rearward of said intermediate wall;

said sidewalls, said floor and said front wall defining a primary solids separation section;

said sidewalls, said floor, said front wall and said intermediate wall defining a secondary separation section;

said front wall defining a cutout dam for flow of water from said primary solids separation section to said secondary solids separation section;

said sidewalls, said floor, said intermediate wall and said rear wall defining an oil and water separation and pump water collection section;

said intermediate wall defining a cutout dam for flow of water from said secondary solids separation section to said oil and water separation and pump water collection section;

opposing pre-cast pit wall units having forward ends and rear ends;

said opposing pit wall units being connectable at their rear ends with respective said forward ends of said sidewalls of said water separation unit, said opposing pit wall units defining a drive-down ramp section; and an array of protuberances formed on said opposing side walls and a pair of lift braces mounted on said opposing side walls at said array of protuberances for lifting said pre-cast, modular, drive-down pit system.

6. The system of claim 5, wherein each lift brace has a first end and a second end and wherein a respective L-shaped plate is attached at each first end and each second end and wherein each L-shaped plate has a horizontal part disposed on a respective one of said array of protuberances.

7. The system of claim 6, wherein each horizontal part has an opening therein, wherein a respective rod is disposed through each respective opening.

8. The system of claim 7, wherein each respective rod has an upper end and a lower end, wherein each upper end terminates in an eyebolt and each lower end is embedded in a respective protuberance.

9. The system of claim 8 further including a respective array of rebars embedded in each protuberance and surrounding each lower end of each respective rod.

10. A pre-cast, modular, drive-down pit system for water separation, comprising:

a pre-cast water separation unit comprising:

opposing sidewalls having forward ends;

a floor coextensive with said sidewalls and having a forward end, said floor having a bottom surface;

an array of weight reduction cells formed on said bottom surface;

a front wall extending between said sidewalls and spaced rearward of said sidewall forward ends;

an intermediate wall extending between said sidewalls and spaced rearward of said front wall;

a rear wall extending between said sidewalls and spaced rearward of said intermediate wall;

said sidewalls, said floor and said front wall defining a primary solids separation section;

said sidewalls, said floor, said front wall and said intermediate wall defining a secondary separation section;

said front wall defining a cutout dam for flow of water from said primary solids separation section to said secondary solids separation section;

said sidewalls, said floor, said intermediate wall and said rear wall defining an oil and water separation and pump water collection section;

said intermediate wall defining a cutout dam for flow of water from said secondary solids separation section to said oil and water separation and pump water collection section;

opposing pre-cast pit wall units having forward ends and rear ends;

said opposing pit wall units being connectable at their rear ends with respective said forward ends of said sidewalls of said water separation unit, said opposing pit wall units defining a drive-down ramp section;

apparatus for lifting said pre-cast, modular, drive-down pit system, said apparatus including a pair of lift braces mounted on said opposing side walls;

an array of protuberances formed on said opposing sidewalls, said pair of lift braces being mounted on said array of protuberances;

pre-formed openings disposed in selected ones of said sidewalls, said front wall, said rear wall and said intermediate wall; and knock out plugs closing said openings in said pre-formed openings.

11. The system of claim 10, wherein each lift brace has a first end and a second end and wherein a respective L-shaped plate is attached at each first end and each second end and wherein each L-shaped plate has a horizontal part disposed on a respective one of said array of protuberances.

12. The system of claim 11, wherein each horizontal part has an opening therein, and wherein a respective rod is disposed through each respective opening.

13. The system of claim 12, wherein each respective rod has an upper end and a lower end, wherein each upper end terminates in an eyebolt and each lower end is embedded in a respective protuberance.

14. The system of claim 13 further including a respective array of rebars embedded in each protuberance and surrounding each lower end of each respective rod.

15. The system of claim 10, including a safety rail system mounted on selected walls of said pre-cast, modular, drive-down pit system, said safety rail system having ends attached to steel plates and wherein said steel plates are embedded in said selected walls.

* * * * *